US007308680B2

(12) United States Patent
Grover et al.

(10) Patent No.: US 7,308,680 B2
(45) Date of Patent: Dec. 11, 2007

(54) INTERMEDIATE REPRESENTATION FOR MULTIPLE EXCEPTION HANDLING MODELS

(75) Inventors: Vinod K. Grover, Mercer Island, WA (US); Akella V. S. Sastry, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/505,090

(22) Filed: Aug. 15, 2006

(65) Prior Publication Data

US 2007/0006192 A1    Jan. 4, 2007

Related U.S. Application Data

(63) Continuation of application No. 10/609,275, filed on Jun. 26, 2003, now Pat. No. 7,120,898.

(51) Int. Cl.
G06F 9/44 (2006.01)
G06F 9/45 (2006.01)
G06F 11/00 (2006.01)

(52) U.S. Cl. ................ 717/114; 717/147; 717/148; 714/48

(58) Field of Classification Search ................ 717/114, 717/147, 148; 714/48
See application file for complete search history.

(56) References Cited

U.S. PATENT DOCUMENTS

| | | | |
|---|---|---|---|
| 4,197,978 | A | 4/1980 | Kasper |
| 4,734,854 | A | 3/1988 | Afshar |
| 5,355,491 | A | 10/1994 | Lawlor et al. |
| 5,488,727 | A | 1/1996 | Agrawal et al. |
| 5,598,560 | A | 1/1997 | Benson |
| 5,659,753 | A | 8/1997 | Murphy |

(Continued)

FOREIGN PATENT DOCUMENTS

EP    0 463 583    1/1992

(Continued)

OTHER PUBLICATIONS

"Common Language Infrastructure (CLI), Partition 1: Concepts and Architecture," ECMA TC39/TG3, Section 11.6, pp. 1-103, Oct. 2002.

(Continued)

Primary Examiner—Tuan Dam
Assistant Examiner—J. Derek Rutten
(74) Attorney, Agent, or Firm—Klarquist Sparkman, LLP

(57) ABSTRACT

As described herein, an intermediate representation of a source code file may be used to explicitly express exception handling control flow prior to generating object code for the source code. As further described herein, a single uniform set of instructions of the intermediate representation may be used for expressing multiple different exception handling mechanisms related to multiple different programming languages. The intermediate form of the exception handling instructions may be generated by translating an intermediate language representation of the source code file. Representations of the source code in multiple different intermediate languages may be translated to a single uniform set of instructions of the intermediate representation. The intermediate form of the exception handling instructions may then be used by software development tools for such tasks as code generation, code optimization, code analysis etc. Thus, the same methods for code optimizations, analysis and generation may be used for intermediate representations of multiple different languages.

20 Claims, 34 Drawing Sheets

U.S. PATENT DOCUMENTS

| | | | |
|---|---|---|---|
| 5,696,974 | A | 12/1997 | Agrawal et al. |
| 5,742,828 | A | 4/1998 | Canady et al. |
| 5,754,858 | A | 5/1998 | Broman et al. |
| 5,768,595 | A | 6/1998 | Gillies |
| 5,778,233 | A | 7/1998 | Besaw et al. |
| 5,857,105 | A | 1/1999 | Ayers et al. |
| 5,918,235 | A | 6/1999 | Kirshenbaum et al. |
| 5,937,195 | A | 8/1999 | Ju et al. |
| 5,943,499 | A | 8/1999 | Gillies et al. |
| 5,966,702 | A | 10/1999 | Fresko et al. |
| 5,999,739 | A | 12/1999 | Soni et al. |
| 6,009,273 | A | 12/1999 | Ayers et al. |
| 6,070,011 | A | 5/2000 | Liu et al. |
| 6,148,302 | A | 11/2000 | Beylin et al. |
| 6,182,284 | B1 | 1/2001 | Sreedhar et al. |
| 6,212,672 | B1 | 4/2001 | Keller et al. |
| 6,249,910 | B1 | 6/2001 | Ju et al. |
| 6,253,304 | B1 | 6/2001 | Hewitt et al. |
| 6,286,134 | B1 | 9/2001 | Click et al. |
| 6,292,938 | B1 | 9/2001 | Sarkar et al. |
| 6,330,717 | B1 | 12/2001 | Raverdy et al. |
| 6,353,924 | B1 | 3/2002 | Ayers et al. |
| 6,363,522 | B1 | 3/2002 | Click et al. |
| 6,374,368 | B1 | 4/2002 | Mitchell et al. |
| 6,421,667 | B1 | 7/2002 | Codd et al. |
| 6,460,178 | B1 | 10/2002 | Chan et al. |
| 6,463,581 | B1 | 10/2002 | Bacon et al. |
| 6,481,008 | B1 | 11/2002 | Chaiken et al. |
| 6,526,570 | B1 | 2/2003 | Click et al. |
| 6,560,774 | B1 | 5/2003 | Gordon et al. |
| 6,578,090 | B1 | 6/2003 | Motoyama et al. |
| 6,598,220 | B1 | 7/2003 | Valys et al. |
| 6,625,804 | B1 | 9/2003 | Ringseth et al. |
| 6,625,808 | B1 | 9/2003 | Tarditi |
| 6,629,312 | B1 | 9/2003 | Gupta |
| 6,634,023 | B1 | 10/2003 | Komatsu et al. |
| 6,662,356 | B1 | 12/2003 | Edwards et al. |
| 6,678,805 | B1 | 1/2004 | Corduneanu et al. |
| 6,745,383 | B1 | 6/2004 | Agarwal et al. |
| 6,748,584 | B1 | 6/2004 | Witchel et al. |
| 6,981,249 | B1 | 12/2005 | Knoblock et al. |
| 7,055,132 | B2 | 5/2006 | Bogdan et al. |
| 7,117,488 | B1 | 10/2006 | Franz et al. |
| 7,120,898 | B2 | 10/2006 | Grover et al. |
| 2002/0083425 | A1 | 6/2002 | Gillies et al. |
| 2002/0095667 | A1 | 7/2002 | Archambault |
| 2002/0166115 | A1 | 11/2002 | Sastry |
| 2002/0170044 | A1 | 11/2002 | Tarditi |
| 2003/0101335 | A1 | 5/2003 | Gillies et al. |
| 2003/0101380 | A1 | 5/2003 | Chaiken et al. |
| 2003/0217196 | A1 | 11/2003 | Chan et al. |
| 2003/0217197 | A1 | 11/2003 | Chan et al. |
| 2003/0226133 | A1 | 12/2003 | Grover |
| 2004/0025152 | A1 | 2/2004 | Ishizaki et al. |
| 2004/0093604 | A1 | 5/2004 | Demsey et al. |
| 2004/0095387 | A1 | 5/2004 | Demsey et al. |
| 2004/0098710 | A1 | 5/2004 | Radigan |
| 2004/0098724 | A1 | 5/2004 | Demsey et al. |
| 2004/0098731 | A1 | 5/2004 | Demsey et al. |
| 2004/0172639 | A1 | 9/2004 | Luo et al. |

FOREIGN PATENT DOCUMENTS

| | | |
|---|---|---|
| EP | 0 665 493 | 8/1995 |
| EP | 0 757 313 | 2/1997 |
| EP | 1 049 010 | 11/2000 |
| WO | WO 01/48607 | 7/2001 |

OTHER PUBLICATIONS

"The LEX & YACC Page," http://dinosaur.compilertools.net/, 4 pages, website visited on Jun. 16, 2003.

"SMGN Reference Manual," http://suif.stanford.edu/suif/suif2/doc-2.20-4/, pp. 1-3, May 2003.

"Zephyr Abstract Syntax Description Language (ASDL): Zephyr ASDL," http://web.archive.org/web/19991103153820/http://www.cs.virginia.edu/zephyr/asdl.html, 1 page, Nov. 3, 1999.

"Zephyr Compiler Infrastructure: Zephyr: Tools for a National Compiler Infrastructure," http://web.archive.org/web/20000817014546/http://www.cs.virginia.edu/zephyr/, 1 page, Aug. 17, 2000.

"Zephyr Computer Systems Description Languages (CSDL): Generating Machine-Dependent Compiler Parts Using CSDL," http://web.archive.org/web/20000829045324/www.cs.virginia.edu/zephyr/csdl/, 1 page, Aug. 29, 2000.

"Zephyr Register Transfer Lists (RTLs): Compiling with Register Transfer Lists (RTLs)," http://web.archive.org/web/20000829045407/http://www.cs.virginia.edu/zephyr/rtl.html, 2 pages, Aug. 29, 2000.

"Zephyr Very Portable Optimizer (vpo): Machine-Independent Optimization," http://web.archive.org/web/20010424131242/http://www.cs.virginia.edu/zephyr/vpo/, 1 page, Apr. 24, 2001.

Adl-Tabatabai et al., "Code Reuse in an Optimizing Compiler," ACM SIGPLAN Notices, Proceedings of the Eleventh Annual Conference on Object-Oriented Programming Systems, Languages, and Applications, vol. 31, Issue 10, pp. 51-68, Oct. 1996.

Aigner et al., "An Overview of the SUIF2 Compiler Infrastructure," Technical Report, Computer Systems Laboratory, Stanford University and Portland Group, Inc., pp. 1-14, 2000.

Aigner et al., "SUIF Compiler System: The SUIF Program Representation," Computer Systems Laboratory, Stanford University and The Portland Group, Inc., http://suif.stanford.edu/suif/suif2/doc-2.2.0-4/suifguide/, pp. 1-30, Aug. 14, 2000.

Appel et al., "The Zephyr Compiler Infrastructure," Internal Report, http://www.cs.virginia.edu/zephyr, Princeton University and University of Virginia, pp. 1-10, Nov. 6, 1998.

Ayers et al., "Scalable Cross-Module Optimization," ACM SIGPLAN Notices, Proceedings of the ACM SIGPLAN 1998 Conference on Programming Language Design and Implementation, vol. 33, Issue 5, pp. 301-312, May 1998.

Benitez et al., "Target-Specific Global Code Improvement: Principles and Applications," Technical Report CS-94-92, Department of Computer Science, University of Virginia, pp. 1-14, 1994.

Blickstein et al., "The GEM Optimizing Compiler System," Digital Technical Journal, vol. 4, No. 4, Special Issue, pp. 1-17, 1992.

Brooks et al., "Design of An Optimizing, Dynamically Retargetable Compiler for Common Lisp," Proceedings of the 1986 ACM Conference on LISP and functional programming, pp. 67-85, Aug. 1986.

Devanbu, "Re-targetability in Software Tools," ACM SIGAPP Applied Computing Review, vol. 7, Issue 3, pp. 19-26, Sep. 1999.

Engler, "VCODE: A Retargetable, Extensible, Very Fast Dynamic Code Generation System," ACM SIGPLAN Notices, Proceedings of the ACM SIGPLAN 1996 Conference on Programming Language Design and Implementation, vol. 31, Issue 5, pp. 160-170, May 1996.

Ganapathi et al., "Retargetable Compiler Code Generation," ACM Computing Surveys (CSUR), vol. 14, Issue 4, pp. 573-592, Dec. 1982.

Goodenough, "Exception Handling: Issues and a Proposed Notation," Communications of the ACM, vol. 18, No. 12, pp. 683-696, Dec. 1975.

Guilan et al., "Retargetable Cross Compilation Techniques—Comparison and Analysis of GCC and Zephyr," *ACM SIGPLAN Notices*, Technical Correspondence, vol. 37, Issue 6, pp. 38-44, Jun. 2002.

Hayes et al., "Component Design of Retargetable Program Analysis Tools that Reuse Intermediate Representations," Proceedings of the 22nd International Conference on Software Engineering, Limerick, Ireland, ACM, pp. 356-365, Jun. 2000.

Heine et al., "Interprocedural Program Analyses," ACM SIGPLAN 2000 Conference on Programming Language Design and Implementation, Vancouver, B.C., 22 pages, http://suif.stanford.edu/suif/suif2/doc-2.2.0-4/tutorial/analysis.ppt, Jun. 2000.

Heine, "An Overview of the SUIF2 Base Infrastructure," ACM SIGPLAN 2000 Conference on Programming Language Design and Implementation, Vancouver, B.C., 30 pages, http://suif.stanford.edu/suif/suif2/doc-2.2.0-4/tutorial/basesuif.ppt, Jun. 2000.

Holzle et al., "OSUIF: SUIF For Objects," ACM SIGPLAN 2000 Conference on Programming Language Design and Implementation, Vancouver, B.C., pp. 1-17, http://suif.stanford.edu/suif/suif2/doc-2.2.0-4/_tutorial/osuif-intro.ps, Jun. 2000.

Kessler et al., "EPIC—A Retargetable, Highly Optimizing Lisp Compiler," ACM SIGPLAN Notices, Proceedings of the 1986 SIGPLAN Symposium on Compiler Construction, vol. 21, Issue 7, pp. 118-130, Jul. 1986.

Khedker et al., "Bidirectional Data Flow Analysis: Myths and Reality," ACM SIGPLAN Notices, vol. 34, No. 6, pp. 47-57, Jun. 1999.

Kienle, "OSUIF: A Closer Look," ACM SIGPLAN 2000 Conference on Programming Language Design and Implementation, Vancouver, B.C., pp. 1-31, http://suif.stanford.edu/suif/suif2/doc-2.2.0-4/_tutorial/osuif-details.ps, Jun. 2000.

Knoop et al., "Lazy Code Motion," In Proceedings of the ACM SIGPLAN '92 Conference on Programming Language Design and Implementation, San Francisco, CA, 11 pages, Jun. 1992.

Knoop et al., "Partial Dead Code Elimination," In Proceedings of the ACM SIGPLAN '94 Conference on Programming Language Design and Implementation, 12 pages, Jun. 1994.

Lam, "An Overview of the SUIF2 System," ACM SIGPLAN '99 Conference on Programming Language Design and Implementation, Atlanta GA, 20 pages, http:suif.stanford.edu/suif/suif2/doc-2.2.0-4/_tutorial/suif-intro.ppt, May 4, 1999.

Lim, "Affine Partitioning for Parallelism & Locality," ACM SIGPLAN 2000 Conference on Programming Language Design and Implementation, Vancouver, B.C., 16 pages, http://suif.stanford.edu/suif/suif2/doc-2.2.0-4/_tutorial/affine.ppt, Jun. 2000.

Morel et al., "Global Optimization by Suppression of Partial Redundancies," Communications of the ACM, vol. 22, No. 2, pp. 96-103, Feb. 1979.

Ramsey et al., "Machine Descriptions to Build Tools for Embedded Systems," Proceedings of the ACM SIGPLAN Workshop on Languages, Compilers, and Tools for Embedded Systems, 17 pages, 1998.

Smith, "Machine SUIF," ACM SIGPLAN 2000 Conference on Programming Language Design and Implementation, Vancouver, B.C., 15 pages, Jun. 2000.

Stallman, "Using and Porting the GNU Compiler Collection," 504 pages, http://www.skyfree.org/linux/references/gcc-v3.pdf, Jul. 28, 1999.

Wegbreit, "Property Extraction in Well-Founded Property Sets," IEEE Transactions on Software Engineering, vol. 1, No. 3, pp. 270-285, Sep. 1975.

"Attribute-Based Templates for Microsoft .NET", 2001, newtelligence AG, 7 pages.

Tarditi et al.; "No Assembly Required: Compiling Standard ML to C"; Kluwer Academic Publishers, 1990; pp. 1-16.

Okasaki et al.; "Call-by-Need and Continuation-passing Style"; Lisp and Symbolic Computation: An International Journal; Kluwer Academic Publishers, 1993; pp. 1-25.

Johnson et al.; "Dependence-Based Program Analysis"; ACM SIGPLAN'93 PLDI, Jun. 1993; pp. 1-12.

Ayguade et al.; "A Uniform Internal Representation for High-Level and Instruction-Level Transformations"; 1994; pp. 1-25.

Weaver et al.; "Score: A Compiler Representation for Heterogeneous Systems"; Dec. 1995; pp. 1-14.

Saito et al.; "PROMIS IR Design"; Sep. 29, 1997; pp. 1-4.

Saito et al.; "PROMIS IR Implementation—AST Components—"; Sep. 29, 1997; pp. 1-4.

Polychronopoulos et al.; "The Promis Compiler Project—Annual Report"; Oct. 1, 1997; pp. 1-15.

Cho et al.; "High-Level Information—An Approach for Integrating Front-End and Back-End Compiler"; Aug. 1998; pp cover page and 1-19.

Larus; "Whole Program Paths"; Proceedings of the SIGNPLAN'99 Conference on Programming Language Design and Implementation (PLDI 99), May 1999; pp. 1-11.

Fitzgerald et al.; "Marmot: An Optimizing Compiler for Java"; Technical Report MSR-TR-99-33; Jun. 16, 1999; pp cover page and 1-29.

Fitzgerald et al.; "The Case Profile-Directed Selection of Garbage Collectors"; 2000; pp. 1-10.

"1.3 Compiler Architecture" http://lambda.uta.edu/cse5317/notes/node5.html visited on May 20, 2003; pp. 1-2.

"Implementation of a Parallelizing Compiler with a Universal Intermediate Representations: Translating of Source Codes into Universal Intermediate Representations" http://www.ipsj.or.jp/members/SIGNotes/Eng/22/1997/017/article004.html visited on May 20, 2003; pp. 1-2.

"Scale Download"; Dept. of Computer Science, University of Massachusetts Amherst; http://www-ali.cs.umass.edu/Scale/download.html visited on May 20, 2003; pp. 1-13.

"Overview of the SA-C Compiler" http://www.cs.colostate.edu/Cameron/compiler.html visited on May 20, 2003; pp. 1-2.

"PROMIS Release Announcement" http://www.csrd.uiuc.edu/promis/release_announcement.html visited on May 20, 2003; pp. 1-3.

"Scale"; Dept. of Computer Science, University of Massachusetts Amherst; http://www-ali.cs.umass.edu/Scale/ visited on May 20, 2003; pp. 1-46.

"CIL: Infrastructure for C Program Analysis and Transformation"; May 30, 2003; pp. 1-54.

"PROMIS Implementation—The Illinois-Irvine PROMIS Team" http://www.csrd.uiuc.edu/promis/ visited on Jun. 4, 2003; pp. 1-32.

"Illinois-Irvine PROMIS Compiler Internal Representation" http://www.csrd.uiuc.edu/promis/ visited on Jun. 4, 2003; pp. 1-17.

"Technical Overview" http://www.csrd.uiuc.edu/promis/overview.html visited on Jun. 4, 2003; pp. 1-2.

"A Parallelizing Compiler Framework" http://www.csrd.uiuc.edu/promis/home.html visited on Jun. 4, 2003; pp. 1-2.

"Demystifying .NET Compilation" http://www.zdnet.com.au/printfriendly?AT=2000035027-20264543, pp. 1-4, including 1 page of "Figure A", Apr. 12, 2002.

Harper et al., "Compiling Polymorphism Using Intensional Type Analysis", ACM Symposium on Principles of Programming Languages, pp. 130-141, Jan. 1995.

Tarditi et al., "TIL: A Type-Directed Optimizing Compiler for ML", 1996 SIGPLAN Conference on Programming Language Design and Implementation, pp. 181-192, May 1996.

Tarditi, "Design and Implementation of Code Optimizations for a Type-Directed Compiler for Standard ML", PhD Thesis, Carnegie Mellon University, 6 pages of introduction and pp. i-266, Dec. 1996 (Available as Technical Report CMU-CS-97-108).

Morrisett et al., "Stack-Based Typed Assembly Language", Xavier Leroy and Atsushi Ohori, editors, Lecture Notes in Computer Science, vol. 1473, pp. 28-52, Mar. 1998.

Colby et al., "A Certifying Compiler for Java", 2000 SIGPLAN Conference on Programming Language Design and Implementation, pp. 95-107, Vancouver, Canada, Jun. 2000.

Necula, "Compiling With Proofs", PhD thesis, Carnegie Mellon University, 27 pages, Sep. 1998.

Alpern et al., "Detecting Equality of Variables in Programs"Proceedings of the 15th ACM SIGPLAN-SIGACT Symposium on Principles of Programming Languages, pp. 1-11, 1988.

Bacon, "Fast and Effective Optimization of Statically Typed, Object-Oriented Languages", PhD thesis, Computer Science Division, University of California, Berkeley, 3 pages of introduction and pp. i-141, 1997.

Bodik et al., "ABCD: Eliminating Array Bounds Checks on Demand", Proceedings of ACM SIGPLAN 2000 Conference on Programming Language Design and Implementation, pp. 321-333.

Cytron, "Efficiently Computing Static Single Assignment Form and the Control Dependence Graph", ACM Transactions on Programming Languages and Systems, pp. 451-490, 1991.

Dean et al., "Optimizations of Object-Oriented Programs Using Static Class Hierachy Analysis", European Conference on Object-Oriented Programming, pp. 77-101, 1995.

Gay et al., "Fast Escape Analysis and Stack Allocation for Object-Based Programs", Proceedings of the 2000 International Conference on Compiler Construction, 12 pages, 2000.

Gupta, "Optimizing Array Bound Checks Using Flow Analysis", ACM Letters on Programming Languages and Systems, pp. 135-150, 1993.

Lengauer et al, "A Fast Algorithm for Finding Dominators in a Flowgraph", ACM Transactions on Programming Languages and Systems, pp. 121-141, 1979.

Mueller et al., "Avoiding Unconditional Jumps by Code Replications", Proceedings of the SIGPLAN '92 Conference on Programming Language Design and iMplementation, pp. 322-330, Jun. 1992.

Ruf, "Effective Synchronization Removal for Java", ACM SIGPLAN Conference on Programming Language Design and Implementation, pp. 208-218, BC, Canada, 2000.

Tarjan, "Testing Flow Graph Reducibility", Proceedings of the Fifth Annual ACM Symposium on Theory of Computing, pp. 96-107, 1973.

Vitek et al., "Efficient Type Inclusion Tests", Proceedings of OOPSLA '97, pp. 142-157, Atlanta, Georgia, 1997.

Sun Microsystems, Inc., "The Java Language Environment: 6—Security in Java, 6.3 The Byte Code Verification Process" http://web.archive.org/web/19990302092957/http://java.sun.com/docs/white/langenv/Security.doc3.html, 3 pages (Mar. 2, 1999).

Yellin, "Low Level Security in Java" http://web.archive.org/web/19990117003400/http://java.sun.com/sfaq/verifier.html 13 pages (Jan. 17, 1999).

ANDF Consortium, "ANDF Overview" http://web.archive.org/web/20021208181559/http://www.info.uni-karlsruhe.de/~andf/overview.htm, 2 pages (Dec. 8, 2002).

X/Open Company Ltd., "X/Open Preliminary Specification, Architecture Neutral Distribution Format (XANDF)" pp. 1-10 (X/Open Company Ltd. 1996).

Cedilla Systems Inc., Products http://web.archive.org/web/20010728193511/www.cedillasystems.com/pages/about/products.html, 2 pages (Jul. 28, 2001).

Lee, A Certifying Compiler for Java http://www-2.cs.cmu.edu/~petel/pcc/pcc-slides/SDIPOP.pdf, 10 pages (Sep. 2000).

Aho et al., "Compilers: Principles, Techniques and Tools", Copyright © 1986 by Bell Telephone Laboratories, Inc., cover and pp. ii, vii-x, 12-14, 463-512, and 585-722.

Appel, "Modern Compiler Implementation in ML", Copyright © Andrew W. Appel, 1998, Cambridge University Press, cover and pp. iv-viii, 148-210, 344-376, and 427-467.

Fraser et al., "A Retargetable C Compiler: Design and Implementation", Copyright © 1995 by AT&T and David R. Hanson, cover and pp. iv, vii-xii, 311-372.

Ramsey and Jones, "A single intermediate language that supports multiple implementations of exceptions," May 2000, ACM SIGPLAN Notices, PLDI 2000, vol. 35, Issue 5, ISBN:1-58113-199-2, pp. 285-298.

Choi et al., "Efficient and precise modeling of exceptions for the analysis of Java programs," Sep. 1999, ACM SIGSOFT Software Engineering Notes, PASTE '99, vol. 24, Issue 5, ISSN:0163-5948, pp. 21-31.

Hennessy "Program optimization and exception handling," Jan. 1981, Proceedings of the 8th ACM SIGPLAN-SIGACT symposium on Principles of programming languages, ISBN:0-89791-029-X, pp. 200-206.

Woo et al., "Alias analysis for exceptions in Java," Jan. 2002, Australian Computer Science Communications, ACSC2002, vol. 24, Issue 1, ISBN-ISSN:1445-1336, 0-909925-82-8, pp. 321-329.

Robillard et al., "Analyzing exception flow in Java programs," Oct. 1999, ACM SIGSOFT Software Engineering Notes, ESEC/FSE-7, vol. 24, Issue 6, ISBN:3-540-66538-2, pp. 322-337.

Gosling "Java intermediate bytecodes," Mar. 1995, ACM SIGPLAN Notices, IR '95, vol. 30, Issue 3, ISSN:0362-1340, pp. 111-118.

Burke et al., "The Jalapeño dynamic optimizing compiler for Java," Jun. 1999, Proceedings of the ACM 1999 conference on Java Grande, ISBN:1-58113-161-5, pp. 129-141.

Litwak, "PURE Java™ 2," Dec. 1999, Sams Publishing, ISBN:0-672-31654-4, Chapter 10.

Kienle, "A SUIF Java Compiler," Aug. 1998, University of California Santa Barbara, Technical Report TRCS98-18, Section 5.9, 6.9, 8.3, and 9.2.15.

"C/C++ Language Reference: try-except Statement," May 11, 2000, Microsoft Corp., accessed Jul. 10, 2005 at <http://msdn.microsoft.com/library/default.asp?url=/library/en-us/vccelng/htm/key_s-z_4.asp>, 2 pages.

International Search Report, Sep. 1, 2005, PCT/US04/15965, 13 pages.

"Scale Download"; Dept. of Computer Science, University of Massachusetts Amherst, http://www-ali.cs.umass.edu/Scale/download.html, accessed Apr. 30, 2003, 8 pages.

"Scale"; Dept. of Computer Science, University of Massachusetts Amherst, http://www-ali.cs.umass.edu/Scale/, 2000, 44 pages.

Arnold et al., "Exploring the Interaction between Java's Implicitly Thrown Exceptions and Instruction Scheduling", International Journal of Parallel Programming, vol. 29, Issue 2, Apr. 2001, pp. 111-137.

Gupta et al., "Optimizing Java Programs in the Presence of Exceptions", 2000, Lecture Notes in Computer Science; vol. 1850, ISBN:3-540-67660-0, pp. 422-446.

Hamilton, "Technical correspondence: language integration in the common language runtime," ACM Press, Feb. 2003, ACM SIGPLAN Notices, vol. 38, Issue 2, pp. 19-28.

Hartoog et al., "Generation of Software Tools from Processor Descriptions for Hardware/Software Codesign," 1997 ACM.

Tanenbaum et al., "A practical tool kit for making portable compilers," Communications of the Association for Computing Machinery, ACM, New York, NY, vol. 26(9):654-660, Sep. 1983.

Keller et al., "Binary Component Adaptation," European Conference on Object Oriented Programming (ECOOP), 12th European Conference Proceedings, Springer-Verlag Berlin, Germany, pp. 307-329, 1998.

Baum et al., "Generic components to foster reuse," Proceedings 37th International Conference on Technology of Object-Oriented Languages and Systems, Tools-Pacific 2000 IEEE Comput. Soc. Los Alamitos, CA, pp. 266-277, 2000.

Kiczales et al., "Aspect-oriented programming," ECOOP, 1241:220-242, Jun. 1997.

Chiba et al., "Josh: An Open AspectJ-like Language," Proceedings of the International Conference on Aspect-Oriented Software Development (AOSD), Lancaster, UK, pp. 102-111, Apr. 22, 2002.

FIG. 6

```
void foo(int a, int b, int c, int d)
{
  x = a div b;
  x = c div d;
}
```

FIG. 7

```
    a.int32, b.int32, c.int32 d.int32 = ENTER foo
    x.int32 = DIV a.int32, b.int32; $HANDLER
    x.int32 = DIV c.int32, d.int32; $HANDLER      —710
    EXIT
$HANDLER:
    UNWIND
    EXIT
```

FIG. 8

```
void foo(int a, int b, int c, int d)
{
  try
  {                810
    x = a + b;
    x = x + c * d;
  }
  finally      815
  {
    x = x + 1;
  }
}
```

FIG. 9

```
    a.int32, b.int32, c.int32 d.int32 = ENTER foo
    x.int32 = ADD a.int32, b.int32;      910
    t.int32 = MUL c.int32, d.int32;
    x.int32 = ADD x.int32, t.int32;
    FINAL $FINALIZE, $END          915
$FINALIZE:
    e.obj32, r.code = FINALLY;           920
    x.int32 = ADD x.int32, 1.int32;
    ENDFINALLY e.obj32, r.code, $END;
$END:
    EXIT;
```

FIG. 10

```
void foo(int a, int b, int c, int d)
{
  try
  {
    x = a div b;  ⎫
    x = c div d;  ⎭ 1010
  }
  finally       1015
  {             ⎞
    x = x + 1; ◄┘
  }
}
```

FIG. 11

```
    a.int32, b.int32, c.int32 d.int32 = ENTER foo
    x.int32 = DIV a.int32, b.int32; $FINALIZE ⎫
    x.int32 = DIV c.int32, d.int32; $FINALIZE ⎭ 1110
    FINAL $FINALIZE, $END  ~1112
$FINALIZE:
    e.obj32, r.code = FINALLY; ~1115
    x.int32 = ADD x.int32, 1.int32;
    ENDFINALLY e.obj32, r.code, $END; $PROPAGATE ~1120
$END:
    EXIT;
$PROPAGATE:
    UNWIND
    EXIT;
```

FIG. 12

```
1240
1    void foo(int a, int b, int c, int d)
2    {
3      try                                    1210
4      {
5        x = a div b;
6        x = c div d;
7      }
8      catch (System.DivideByZeroException f)  ~1215
9      {
10       b = 1;                               1220
11       d = 1;
12     }
13     catch (System.Exception e)  ~1225
14     {
15       bar();                               1231
16     }
17   }
```

FIG. 13

```
    a.int32, b.int32, c.int32 d.int32 = ENTER foo
    x.int32 = a.int32 DIV b.int32; $HANDLER1
    x.int32 = c.int32 DIV d.int32; $HANDLER1   1310
    GOTO $END$
$HANDLER1:                                      1315
    F.DivideByZeroException = TYPEFILTER $CATCH1,
HANDLER2;
$CATCH1:                                        1320
    b.int32 = ASSIGN 1.int32;
    d.int32 = ASSIGN 1.int32;
    GOTO $END
$HANDLER2:                                      1325
    E.Exception = TYPEFILTER $CATCH2, $PROPAGATE;
$CATCH2:                          1330
    CALL bar(); $PROPAGATE
    GOTO $END
$PROPAGATE:
    UNWIND ~1335
    EXIT;
```

FIG. 14

```
void foo(int a, int b, int c, int d)
{
    try
    {                    1410
        x = a div b;
        x = c div d;                      1415
    }
    catch (System.DivideByZeroException f)
    {            1420
        b = 1;
        d = 1;
    }                             1425
    catch (System.Exception e)
    {
        bar();   1430
    }
    finally
    {        1440
        x = x + 1;
    }
}
```

FIG. 15

```
a.int32, b.int32, c.int32 d.int32 = ENTER foo
    x.int32 = a.int32 DIV b.int32; $HANDLER1
    x.int32 = c.int32 DIV d.int32; $HANDLER1     }1510
    FINAL $FINALIZE, $END
$HANDLER1:
    F.DivideByZeroException = TYPEFILTER $CATCH1,  ~1515
$HANDLER2;
$CATCH1:                                1520
    b.int32 = ASSIGN 1.int32;
    d.int32 = ASSIGN 1.int32;
    FINAL $FINALIZE, $END; ~1521
$HANDLER2:
    E.Exception = TYPEFILTER $CATCH2, $FINALIZE;  ~1525
$CATCH2:                                1530
    CALL bar(); $FINALIZE
    FINAL $FINALIZE, $END ~1531
$FINALIZE:
                                        1540
    e.obj32, r.code = FINALLY;
    x.int32 = ADD x.int32, 1.int32;
    ENDFINALLY e.obj32, r.code, $END; $PROPAGATE
$PROPAGATE: 1550
    UNWIND
    EXIT;        1560
$END:
    EXIT;
```

FIG. 16

```
y = y + 4;                        // S0
try
{
        x = a div b;      // S1
1610    try                               1615
        {
                x = c div d;    // S2
        }
        catch (System.Foo)
        {                                 1625
                x = x div y     // S3
        }
        finally                   1635
        {
                x = 2;          // S4
        }
}
catch (System.DivideByZeroException f)
{
        b = 1;            // S5    1620
        d = 1;
}
catch (System.Exception e)
{                                 1630
        bar();            // S6
}
y = y + 2;                        // S7
}
```

FIG. 17

```
    y.int32 = ADD y.int32, 1.int32                              // S0
    x.int32 = a.int32 DIV b.int32; $HANDLER1  ~1705            // S1
    x.int32 = c.int32 DIV d.int32; $HANDLER3  ~1706            // S2
    FINAL $FINALIZE, $S7;
$FINALIZE:                    1725
    e0, r0 = FINALLY
    x.int32 = ASSIGN 2.int32;                                   // S4
    ENDFINALLY e0, r0, $S7; $HANDLER1 ~1726
$HANDLER3:
    e1 = TYPEFILTER $CATCH3, $FINALIZE
$CATCH3:
    x.int32 = DIV x.int32, y.int32; $FINALIZE    1720          // S3
    FINAL $FINALIZE, $S7;     1710
$HANDLER1:
    e2 = TYPEFILTER $CATCH1, $HANDLER2;
$CATCH1:
    b.int32 = ASSIGN 1.int32;                                   // S5
    d.int32 = ASSIGN 1.int32;
    GOTO $S7;              1715
$HANDLER2:
    e3 = TYPEFILTER $CATCH2, $PROPAGATE;
$CATCH2:
    CALL bar(); $PROPAGATE;                                     // S6
    GOTO $S7
$PROPAGATE:
    UNWIND
    EXIT;
$S7:
    y.int32 = ADD y.int32, 1.int32                              // S7
    GOTO $END;
$END:
    EXIT;
```

FIG. 19A

| ENTRY | INFO TAG ⟵1915 | PROTECTED BLOCK ⟵1910 | DESTINATION/HANDLER BLOCK ⟵1920 |
|---|---|---|---|
| 1 | TRY CATCH | 3-7 | 8-12 |
| 2 | TRY CATCH | 3-7 | 13-16 |

FIG. 19B

| DESTINATION/HANDLER BLOCK OFFSET | LABEL |
|---|---|
| 8-12 | HANDLER 1 |
| 13-16 | HANDLER 2 |

FIG. 19C

| PROTECTED BLOCK OFFSET | DESTINATION/HANDLER BLOCK OFFSET | LABEL |
|---|---|---|
| 3-7 | 8-12 | HANDLER 1 |
| 3-7 | 13-16 | HANDLER 2 |

FIG. 22

```
void proc()
{
  class1 obj1; // S1
  obj1.foo();  // S2
  class2 obj2; // S3
  obj2.bar();  // S4
}
```

FIG. 23

```
void proc()
{
    ctor1(&obj1);    ← 2310
    try
    {
      obj1.foo();
      ctor2(&obj2);
        try
        {
                      ← 2330
            obj2.bar();
        }
        finally
        {
                      ← 2340
            dtor2(&obj2);
        }
    }
    finally
    {
                      ← 2320
        dtor1(&obj1)
    }
}
```

FIG. 24

```
ENTER proc
CALL class1, &_obj1    $PROPAGATE
CALL foo, &_obj1 $DTOR1
CALL class1,&_obj2 $DTOR1
CALL bar, &_obj2 $DTOR2
FINAL $DTOR2, $NEXT;          ~2410
$NEXT:
    FINAL $DTOR1, $END ~2420
$DTOR2:
    e, r = FINALLY
    CALL DTOR2(&obj2); $DTOR1 ~2435    2430
    ENDFINALLY e, r, $DTOR1, $NEXT
$DTOR1:
    e2, r2 = FINALLY                   2440
    CALL DTOR1(&obj1); $PROPAGATE ~2445
    ENDFINALLY e1, r2, $PROPAGATE, $END
$PROPAGATE:
    UNWIND
    EXIT;
$END:
    EXIT;
```

FIG. 25

```
void proc(int x)
{
  foo(x ? obj1(x) : obj2(x+1));
}
```

FIG. 26

```
void proc()
{
   try
   {
      t1 = x ? ctor(&obj1,x) : NULL;  ~2610
      try
      {
         t2 = x ? NULL : ctor(&obj2,x+1)  ~2620
         foo( x  ? t1 : t2);
      }
      finally
      {
         if (x) dtor(&obj1);  ~2630
      }
   }
   finally
   {
      if (!x) dtor(&obj2);  ~2640
   }
}
```

FIG. 27

```
         _x      =    ENTER proc
         t140    =    CMP(NE) _x, 0
                      CBRANCH(NE) t140, $L4, $L5      ~2710
      $L4:
         t134    =    CALL ctor, &obj1, _x; $PROPAGATE
  2720  t135    =    ASSIGN t134                      2721
      ➤ tv141-  =    ASSIGN [t135)
         $t142   =    ASSIGN 1
                      GOTO $L6
      $L5:
         t137    =    ADD _x, 1                       2731
  2730  t138    =    CALL ctor, &obj2, t137; $PROPAGATE
      ➤ t139    =    ASSIGN t138
         tv141-  =    ASSIGN [t139)
         $t142   =    ASSIGN 0
                      GOTO $L6
      $L6:
         t145    =    ASSIGN tv141-
                      CALL bar, t145
                      FINAL $OBJ1, $L11
      $L11:
                      FINAL $OBJ2, $L12
      $OBJ1:
         r1      =  ➤ FINALLY
         t144    =    CMP(EQ) $t142, 0
                      CBRANCH(EQ) t144, $L9, $L10
      $L9:
                      CALL dtor, &obj1 $PROPAGATE
                      GOTO $L10
      $L10:      2740
                   ➤ ENDFINALLY; r1, [$L11), $PROPAGATE
      $OBJ2:
         r2      =  ➤ FINALLY
         t143    =    CMP(EQ) $t142, 1
                      CBRANCH(EQ) t143, $L7, $L8
      $L7:
                      CALL dtor, &obj2 $PROPAGATE
                      GOTO $L8
      $L8:       2750
                   ➤ ENDFINALLY; r2, [$L12), $PROPAGATE
      $PROPAGATE:
                      UNWIND
                      EXIT
      $L12:
                      EXIT
```

FIG. 28

```
Obj foo(int x)
{
  Obj a , b;  ~2810
  bar();
  if (x == 0)
  {
     return Obj(1);  ~2820
  }
  else
  {
     return Obj(2); ~2830
  }
}
```

FIG. 29A

```
Obj foo(int x)
  {
    CALL ctor (&a); $unwind;
    CALL ctor (&b); $final_a;
    bar(); $final_b;
    if (x == 0)
    {
      CALL ctor Obj (&r1,1) ; $final_b;  ~2960
      $f1 = 1;  ~2950
      FINAL $final_b1; L2
      L2:
        FINAL $final_a1, L1
      L1:
        $f1 = 0;
        FINAL $final_r1, Lret
      Lret:
        return r1;  ~2910
    }
    CALL ctor Obj(&r2, 2); $final_b;
    $f2 = 1;
    FINAL $final_b2, L3
    L3:
      FINAL $final_a2, L4
    L4:
      $f2 = 0;
      FINAL $final_r2, Lret2
    Lret2:
      return r2;
```

FIG. 29B

```
$final_b:
    e, R = FINALLY
    DTOR (&b); $final_a;
    ENDFINALLY e, R, $final_a;
$final_a:
    e, R = FINALLY
    CALL DTOR (&a); $unwind;
    ENDFINALLY e, R, HANDLER:$unwind;
$final_b1:
    e, R = FINALLY
    CALL DTOR (&b); $final_a1;          ~2930
    ENDFINALLY e, R, [L2], $final_a1;
$final_a1:
    e, R = FINALLY
    CALL DTOR (&a); $final_r1;          ~2920
    ENDFINALLY e, R, [L1]; $final_r1;
$final_b2:
    e, R = FINALLY
    CALL DTOR (&b); $final_a2;
    ENDFINALLY e, R,[L3]; $final_a2;
$final_a2:
    e, R = FINALLY
    CALL DTOR (&a); $final_r2;
    ENDFINALLY e, R, [L4]; $final_r2;
$final_r1:
    e, R = FINALLY
    if ($f1 == 1) CALL DTOR (&r1);$unwind;  ~2940
    ENDFINALLY e, R, [Lret1]; $unwind;
$final_r2:
    e, R = FINALLY
    if ($f2 == 1) CALL DTOR (&r2); $unwind;
    ENDFINALLY e, R,[Lret2]; $unwind;
}
```

FIG. 30

```
void proc()
{
    class1 obj1;  // S1 - create an obj of type Class1
    obj1.foo();   // S2 - calling a method on obj.1
    throw foo;    // S3
}
```

FIG. 31

```
void proc()
{
    class1 obj1;                                    // S1
    class1 temp;
    try {
        obj1.foo();                      3110       // S2
            temp.copy_ctor(obj1);//
            special_throw(&temp, &dtor_of_class1)   // S3
    }                                               3120
    finally {
        dtor_of_class1(obj1);
    }                              3130
}
```

FIG. 32

```
    ENTER proc
    CALL ctor1(&obj1); $PROPAGATE
    CALL foo(&obj1);   $DTOR1
    CALL copy_ctor(&temp, &obj1); $DTOR1
    FINAL $DTOR1;
    THROWVAL &temp, &dtor_of_class1; $PROPAGATE
$DTOR1:         ⌞3220          ⌞3230           ↖
    e2, r2 = FINALLY                          3210
    CALL DTOR1(&obj1); $PROPAGATE
    ENDFINALLY e1, r2, $PROPAGATE, $END
$PROPAGATE:
    UNWIND
    EXIT;
$END:
    EXIT;
```

FIG. 33

```
void proc()
{
    __try {
        foo();
    } __except(filter()) {
        body();
    }
    next();
}
```

FIG. 34

```
    ENTER proc
$LABEL:
    SEHENTER;   $HANDLER ~3410
    CALL foo();  $HANDLER ~3420
    GOTO $NEXT;
$HANDLER: ~3430
    x = FILTER
    t = CALL filter(); ~3450
    ENDRESUMEFILTER t, $HANDLERBODY, $END, $LABEL
$HANDLERBODY:                                    ~3440
    CALL body(); $PROPAGATE
    GOTO $NEXT;
$NEXT:
    CALL next();
    EXIT;
$END:
    EXIT;
```

FIG. 38A

```
>>> IL for function ?proc@@YAXXZ:
OPpragma pragma(31)    PR_PRAGSTAT Pragma Status: 0x00800000
OPpragma pragma(32)    PR_INLINE Inline Status: 0x0010
OPpragma pragma(2)     PR_FILENAME Filename key(0x20)
OPpragma pragma(1)     PR_LINENUMBER Line(22)
OPpragma pragma(35)    PR_WARNING 10:OFF; 16:ERR; 72:ERR; 86:OFF;
93:OFF; 120:OFF; 205:OFF; 206:OFF; 217:OFF; 228:OFF; 231:OFF; 246:OFF;
OPblock
OPblock
OPname(?proc@@YAXXZ) symbol(0x288)
OPentry
OPeolist
***** function entry says proc has no parameters ********

**** ctor call for class1 *****************************
OPblock
OPpragma pragma(1)     PR_LINENUMBER Line(23)
OPname(??0class1@@QAE@XZ) symbol(0x25f)              3810
OPname(obj1) symbol(0x28a)
OPconstant integer size(4) align(3) constant(0|0x0)
OPfield address size(4) align(3)
OPconstant integer size(4) align(3) constant(0|0x0)
OPfield address size(4) align(3) Const
OPextract address size(4) align(3) Const
OPmfunc address size(4) align(3)
OPfunction address size(4) align(3) Const functype(20)
OPeolist
******** ********************************

*** dtor call for class1 *****************************
OPname(??1class1@@QAE@XZ) symbol(0x260)
OPname(obj1) symbol(0x28a)                           3820
OPconstant integer size(4) align(3) constant(0|0x0)
OPfield address size(4) align(3)
OPconstant integer size(4) align(3) constant(0|0x0)
OPfield address size(4) align(3) Const
OPextract address size(4) align(3) Const
OPmfunc address size(4) align(3)
OPfunction void size(0) align(1) functype(20)
OPeolist
*********************************************************
```

FIG. 38B

```
OPpushstate address size(4) align(3) EH Flags 0x00000011 ─┐
                                                          ╲
                                                       3830
OPexpression
OPpragma pragma(1)     PR_LINENUMBER Line(24)
OPname(?foo@class1@@QAEXXZ) symbol(0x261)
OPname(obj1) symbol(0x28a)
OPconstant integer size(4) align(3) constant(0|0x0)
OPfield address size(4) align(3)
OPconstant integer size(4) align(3) constant(0|0x0)
OPfield address size(4) align(3) Const
OPextract address size(4) align(3) Const
OPmfunc address size(4) align(3)
OPfunction void size(0) align(1) functype(20)
OPeolist
OPexpression
OPpragma pragma(1)     PR_LINENUMBER Line(25)
OPname(??0class2@@QAE@XZ) symbol(0x274)
OPname(obj2) symbol(0x28b)
OPconstant integer size(4) align(3) constant(0|0x0)
OPfield address size(4) align(3)
OPconstant integer size(4) align(3) constant(0|0x0)
OPfield address size(4) align(3) Const
OPextract address size(4) align(3) Const
OPmfunc address size(4) align(3)
OPfunction address size(4) align(3) Const functype(20)
OPeolist
OPname(??1class2@@QAE@XZ) symbol(0x275)
OPname(obj2) symbol(0x28b)
OPconstant integer size(4) align(3) constant(0|0x0)
OPfield address size(4) align(3)
OPconstant integer size(4) align(3) constant(0|0x0)
OPfield address size(4) align(3) Const
OPextract address size(4) align(3) Const
OPmfunc address size(4) align(3)
OPfunction void size(0) align(1) functype(20)
OPeolist
```

FIG. 38C

```
OPpushstate address size(4) align(3) EH Flags 0x00000011
OPexpression
OPpragma pragma(1)    PR_LINENUMBER Line(26)
OPname(?bar@class2@@QAEXXZ) symbol(0x276)
OPname(obj2) symbol(0x28b)
OPconstant integer size(4) align(3) constant(0|0x0)
OPfield address size(4) align(3)
OPconstant integer size(4) align(3) constant(0|0x0)
OPfield address size(4) align(3) Const
OPextract address size(4) align(3) Const
OPmfunc address size(4) align(3)
OPfunction void size(0) align(1) functype(20)
OPeolist
OPexpression
OPpragma pragma(1)    PR_LINENUMBER Line(27)
OPdtoraction cnt(2) EH Flags 0x00000031
OPexpression                                   ⎯3840
OPgoto symbol(0x289)
OPendblock icon(2)
OPlabel symbol(0x289)
OPexit
OPendblock icon(1)
OPendblock icon(0)
```

INTERMEDIATE REPRESENTATION FOR MULTIPLE EXCEPTION HANDLING MODELS

CROSS REFERENCE TO RELATED APPLICATION

This is a continuation of U.S. patent application Ser. No. 10/609,275, filed Jun. 26, 2003, the disclosure of which is hereby incorporated herein by reference.

TECHNICAL FIELD

The technical field relates to components of a compiler computer program. More specifically the field relates to an intermediate representation of exception handling constructs for compiling a program.

BACKGROUND

Generally speaking, a translator is a computer program that receives as its input a program written in one computer programming language and produces as its output a program in another programming language. Translators that receive as their input a high-level source language (e.g., C++, JAVA, etc.) and generate as their output a low-level language such as assembly language or machine language sometimes are more specifically referred to as compilers. The process of translation within a compiler program generally consists of multiple phases. FIG. 1 illustrates a flow chart showing one such break down of the multiple phases of a compiler. The source program representation in source code is received at 110. Then at 120 the lexical analyzer separates the characters of the source code into logical groups referred to as tokens. The tokens may be key words in the syntax of the source language such as, IF or WHILE, operators such as, + and −, identifiers and punctuation symbols. At 130, the syntax analyzer groups the tokens together into syntactic structures such an expression or a statement. At 140, an intermediate representation (IR) of the source code, including the exception handling constructs, is generated to facilitate compiler back end operations such as code optimization at 150 and then code generation at 160. There can be multiple intermediate representations within a compiler process. During the code optimization phase 150 various techniques may be directed to improving the intermediate representation generated at 140 so that the ultimate object code runs faster and uses less memory. During the final phase at 160, the code generator produces the target program (object code) 170 to be executed by a processor.

Exception handling is invoked when a flaw in the source program is detected. In the existing compiler frameworks, exception handling constructs within the source program are processed separate from the main control flow of the intermediate representation. Traditionally, exception handling constructs are not explicitly represented in the control flow of the intermediate representation. In one well known technique, regions within the source code where exception handling constructs are detected are delimited from the main control flow and thus not subject to the same code optimization techniques as the main control flow. In yet another method, the exception handling constructs are captured within a table outside of the main control flow and the compiler back end processes them separately. Thus, there is a need for intermediate representation for exception handling constructs that allows such constructs to be explicitly represented within the main control flow to take advantage of the same code optimizations and code generation techniques (i.e., compiler back end) as the rest of the source code.

Also, traditionally, intermediate representations have been specific to a source language. Thus, compilers have to be aware of the specific exception handling models of the source language associated with each representation. For our purposes, these exception handling models can be typically characterized by four features. The first feature determines if the exception is synchronous or asynchronous. A synchronous exception is associated with the action of the thread of control that throws and handles it. In this situation, an exception is always associated with an instruction of the thread. In other words, an exception handling action is invoked by an instruction when some condition fails. However, an asynchronous exception is injected into a thread of control other than thread that may have thrown and handled it. In Microsoft CLR (the Common Language Runtime (CLR) is Microsoft's commercial implementation of the Common Language Infrastructure (CLI) specification; Microsoft is a trademark of Microsoft Corporation), this may be caused by aborting a thread via a system API. Such exceptions are not associated to a particular instruction. The effect is to raise an exception in the thread at some suitable point called a synchronization point.

Second, an exception may either terminate or resume the exception causing instruction. In the case of a terminating exception the instruction is terminated and a filter, handler, or a finalization action is initiated. However in the case of a resumption model the offending instruction can be automatically resumed after some handling action is performed. The Structured Exception Handling (SEH) constructs in C/C++ fall into this category. This requires, typically, that the entire region including the exception causing instruction be guarded as if all memory accesses act like volatile accesses. Thus, disallowing any optimization of the memory accesses.

Third, an exception handling model may be precise or imprecise. In precise exception handling models relative ordering of two instructions needs to preserve observable behavior of memory state. This means that a reordering of instructions cannot be performed if a handler or another fragment of code will see different values of variables. Languages such as C#, Microsoft CLR and C++ require a precise mechanism. In such models, the compiler may need to reorder exception instructions relative to each other and any other instruction whose effect is visible globally. In imprecise models, the relative order of instructions on exception effect is undefined and a compiler is free to reorder such instructions. In either model, the order between exception instructions and their handlers is always defined and is based on control dependencies. Some languages like Ada have an imprecise exception model.

Fourth feature of an exception handling model is how handler association is performed in various exception handling models. In most languages, including C++, C#, and Microsoft CLR, handler association is lexical and performed statically. This means that it is statically possible to identify the start of the handler code and this is unique. As explained below this attribute of statically identifying handler bodies may be used to generate the intermediate representation of the exception handling instructions. Thus, there is a need for a single uniform framework for intermediately representing exception handling constructs that is uniform across multiple models for representing exception handling and is capable of accounting for the various attributes of such models described above.

SUMMARY

As described herein, a uniform intermediate representation of exception handling constructs may be used for expressing exception handling models of various languages. In one aspect, a single set of instructions related to the intermediate representation are described herein for expressing multiple different exception handling mechanisms. For example, a common set of related instructions may be used to describe the control flow from a try region to a finally region and then to outside of the finally region. In yet another aspect, control flow from a try region to a catch region may be expressed using a common set of related instructions. Furthermore, filters guarding the handler or catch region may also be expressed. Control flow from a try region to the "except" region to pass the control back to the exception causing region under certain conditions may also be expressed. Exception handling control flow related to object destructors may also be expressed using the uniform intermediate representation of the exception handling constructs.

In a further aspect, methods and systems are described herein for generating the uniform intermediate representation for expressing control flow of exception handling constructs. In one aspect, the intermediate representation may be generated by translating an intermediate language representation of the source code file. Multiple different intermediate languages may be used to generate the intermediate representation of exception handling constructs. In a further aspect, the intermediate representation of the exception handling constructs may be used by software development tools for such tasks as code generation, code optimization, analysis etc.

Additional features and advantages will be made apparent from the following detailed description of illustrated embodiments, which proceeds with reference to accompanying drawings.

BRIEF DESCRIPTION OF DRAWINGS

FIG. 6 is a listing of a pseudo code representation of unguarded exception causing instructions.

FIG. 7 is a listing of an intermediate representation of the code of FIG. 6.

FIG. 8 is a listing of a pseudo code representation of a try code section with non-exception causing instructions guarded by a finally block.

FIG. 9 is a listing of an intermediate representation of the code of FIG. 8.

FIG. 10 is a listing of a pseudo code representation of a try code section with exception causing instructions guarded by a finally block.

FIG. 11 is a listing of an intermediate representation of the code of FIG. 10 along with the appropriate handler labels.

FIG. 12 is a listing of a pseudo code representation of a try code section with exception causing instructions guarded by two filters and two catch blocks.

FIG. 13 is a listing of an intermediate representation of the code of FIG. 12 along with the appropriate handler labels and filters related to the catch blocks.

FIG. 14 is a listing of a pseudo code representation of a try code section with exception causing instructions guarded by two filters, two catch blocks and a finalization code block.

FIG. 15 is a listing of an intermediate representation of the code of FIG. 14 along with the appropriate handler labels and filters related to the catch and finalization blocks.

FIG. 16 is a listing of a pseudo code representation of a nested try code section guarded by a catch block.

FIG. 17 is a listing of an intermediate representation of the code of FIG. 16 along with the appropriate handler labels and filters related to the nested and the outer catch and finalization blocks.

FIG. 19A is an illustration of a data structure of exception handling data table.

FIG. 19B is one illustration of a label map for mapping offsets to their labels.

FIG. 19C is another illustration of a label map after protected blocks are mapped to their respective offsets.

FIG. 22 is a listing of a C++ program illustrating construction and destruction of local objects.

FIG. 23 is a listing of a pseudo code representation for expressing the possible exception handling paths during the constructions and destruction of objects.

FIG. 24 is a listing of an intermediate representation of the code of FIGS. 22 and 23.

FIG. 25 is a listing of a C++ program illustrating conditional construction of expression temporary objects.

FIG. 26 is a listing of a pseudo representation for expressing the possible exception paths for conditional construction and destruction of expression temporary objects.

FIG. 27 is a listing of an intermediate representation of the code of FIG. 26.

FIG. 28 is a listing of a C++ program that returns an object by value.

FIG. 29A is a listing of an intermediate representation of the possible exception paths for destruction of objects by value shown in FIG. 28.

FIG. 29B is a continuation of the listing of FIG. 29A.

FIG. 30 is a listing of a C++ program throwing an object by value.

FIG. 31 is a listing of a pseudo code representation expressing the possible exception paths of throwing value type objects shown in FIG. 30.

FIG. 32 is a listing of an intermediate representation of FIG. 31.

FIG. 33 is a listing of a pseudo code representation of a try code section guarded by an except code block.

FIG. 34 is a listing of an intermediate representation of the code of FIG. 33.

FIG. 38A is a listing of an exemplary code section of FIG. 22 implemented using postfix notation.

FIG. 38B is the continuation of FIG. 38A.

FIG. 38C is the further continuation of FIGS. 38A and B.

DETAILED DESCRIPTION

Figure 1:
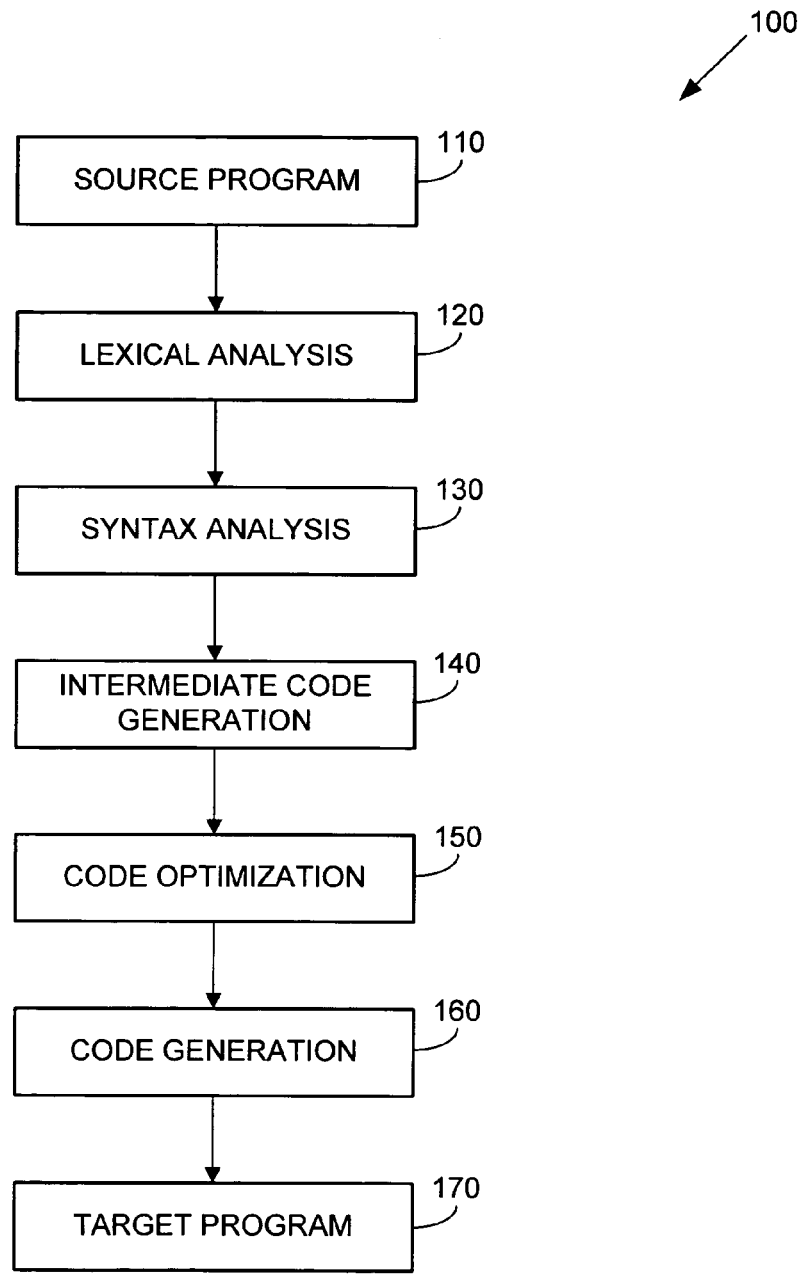
FIG. 1 is a flow chart representing the various processing phases of a typical compiler and its components.
Figure 2:
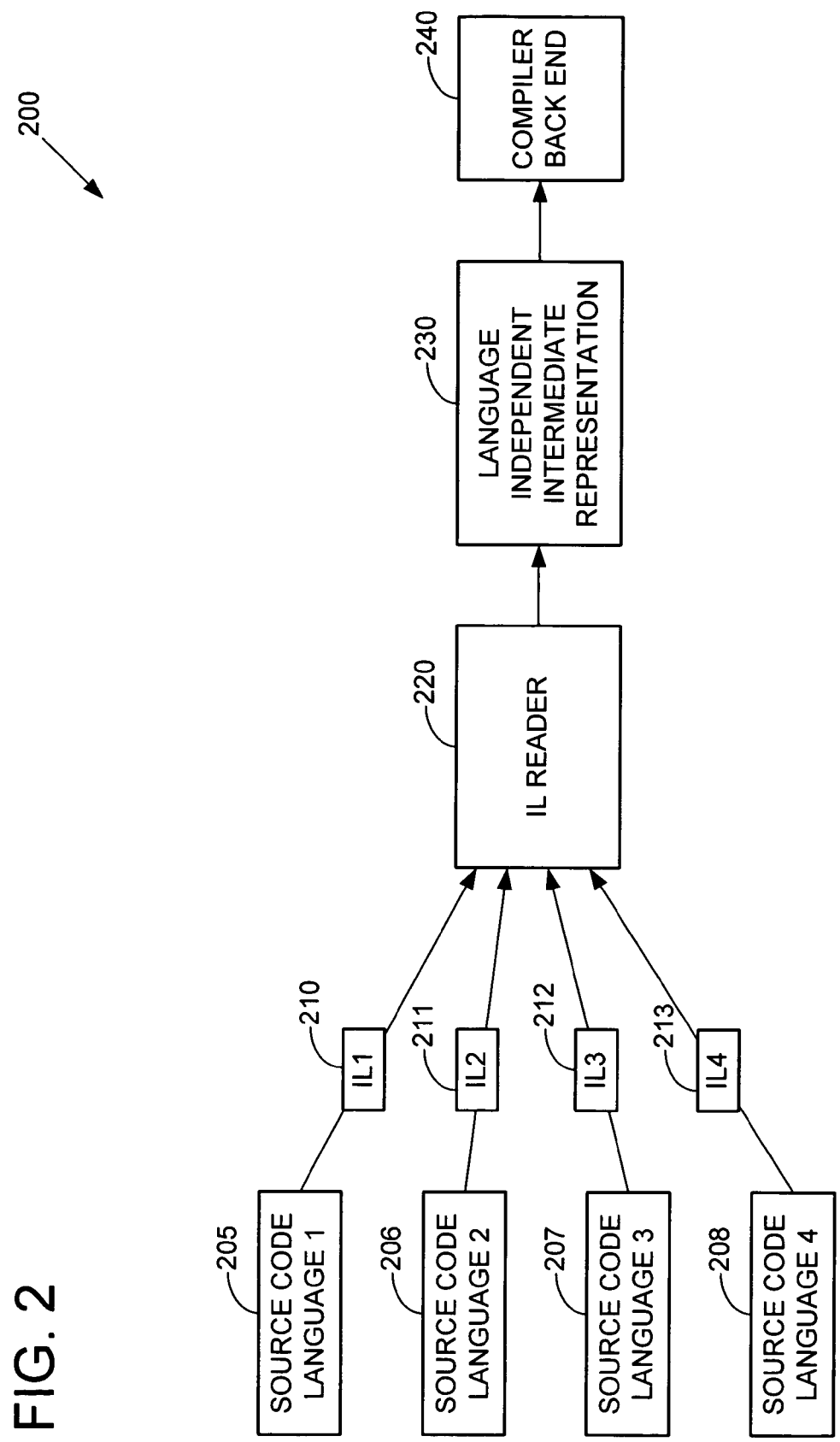
FIG. 2 is a block diagram illustrating a system for generating an intermediate representation of exception handling instructions using a uniform exception handling framework capable of representing multiple language specific exception handling models.

Language Independent Intermediate Representation of Exception Handling Constructs FIG. 2 illustrates a system 200 for implementing a uniform exception handling intermediate representation 230 for multiple source languages (205-208) for code optimization by the compiler back end 240. As shown in FIG. 2, the system 200 includes a intermediate language (IL) representation 210-213 for each of the multiple source code representations 205-208 which is parsed or read by an IL reader 220 which translates the multiple IL representations 210-213 to a single intermediate representation 230. The IL representation is a higher-level intermediate representation than the intermediate representation 230 and may be expressed in any number of well known intermediate languages such as MSIL (Microsoft CLR) (for C#, Visual Basic, JScript, C, and FORTRAN) and CIL (for C++). Even though the system 200 for generating a uniform exception handling framework for multiple languages is shown as having a single IL reader process for multiple source languages, it is possible to implement multiple such readers, each corresponding to one or more of the IL representations 210-213.

Figure 3A:
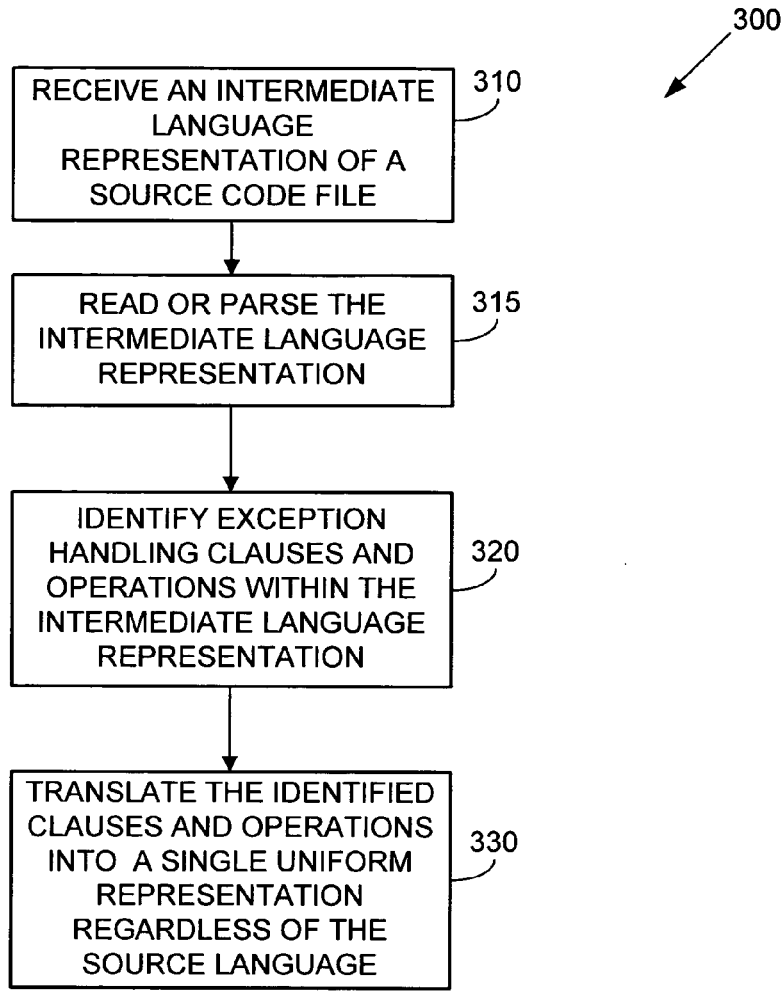
FIG. 3A is a flowchart illustrating a method for generating an intermediate representation of exception handling instructions using a uniform exception handling framework capable of representing multiple language specific exception handling models.

FIG. 3A illustrates a general overall method for using the IL reader 220 to generate a uniform set of intermediate representations for exception handling constructs expressed in a number of different source languages. At 310, the intermediate language representation of software (e.g., an intermediate language representation of a source code file) is received by the reader 220 and at 315, the file is read or parsed to identify exception handling constructs within the IL code stream (320). Then at 330, the reader 220 (which can also be thought of as a virtual machine) generates a single uniform intermediate representation of the exception handling constructs identified previously at 320. Such an exception handling frame work can then be used to simplify the processes of a compiler back end such as code optimizations and code generation.

Figure 3B:
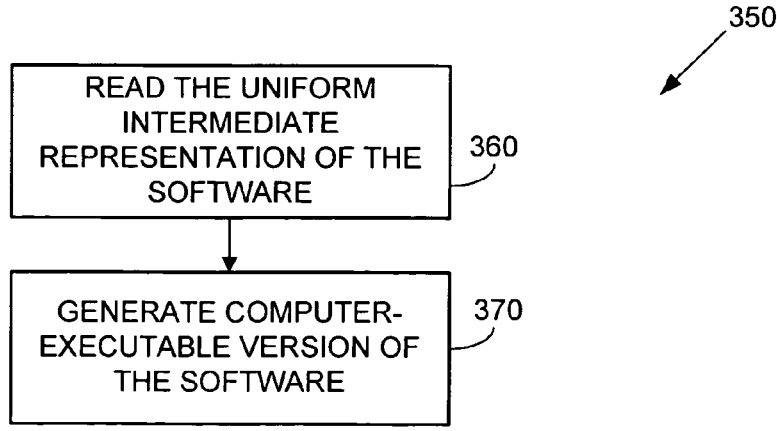
FIG. 3B is a flowchart illustrating a method for reading an intermediate representation of software and generating an executable version therefrom.

The uniform intermediate representation of the software having the exception handling constructs can explicitly express exception handling control of the software. FIG. 3B shows a method 350 for generating executable from the uniform intermediate representation of the software. Such a method can be used, for example, by a compiler or other software development tool when generating an executable version (e.g., machine-specific code or other object code) for the software.

At 360, the uniform intermediate representation is read (e.g., by a compiler or other software development tool). For example, the uniform intermediate representation generated by the method of FIG. 3A can be used. Other transformations, translations, or optimizations to the uniform intermediate representation can be performed as desired.

At 370, a computer-executable version of the software is generated (e.g., by the compiler or other software development tool). The computer-executable version of the software implements the exception handling control flow of the software, based on the uniform intermediate representation.

Figure 4:
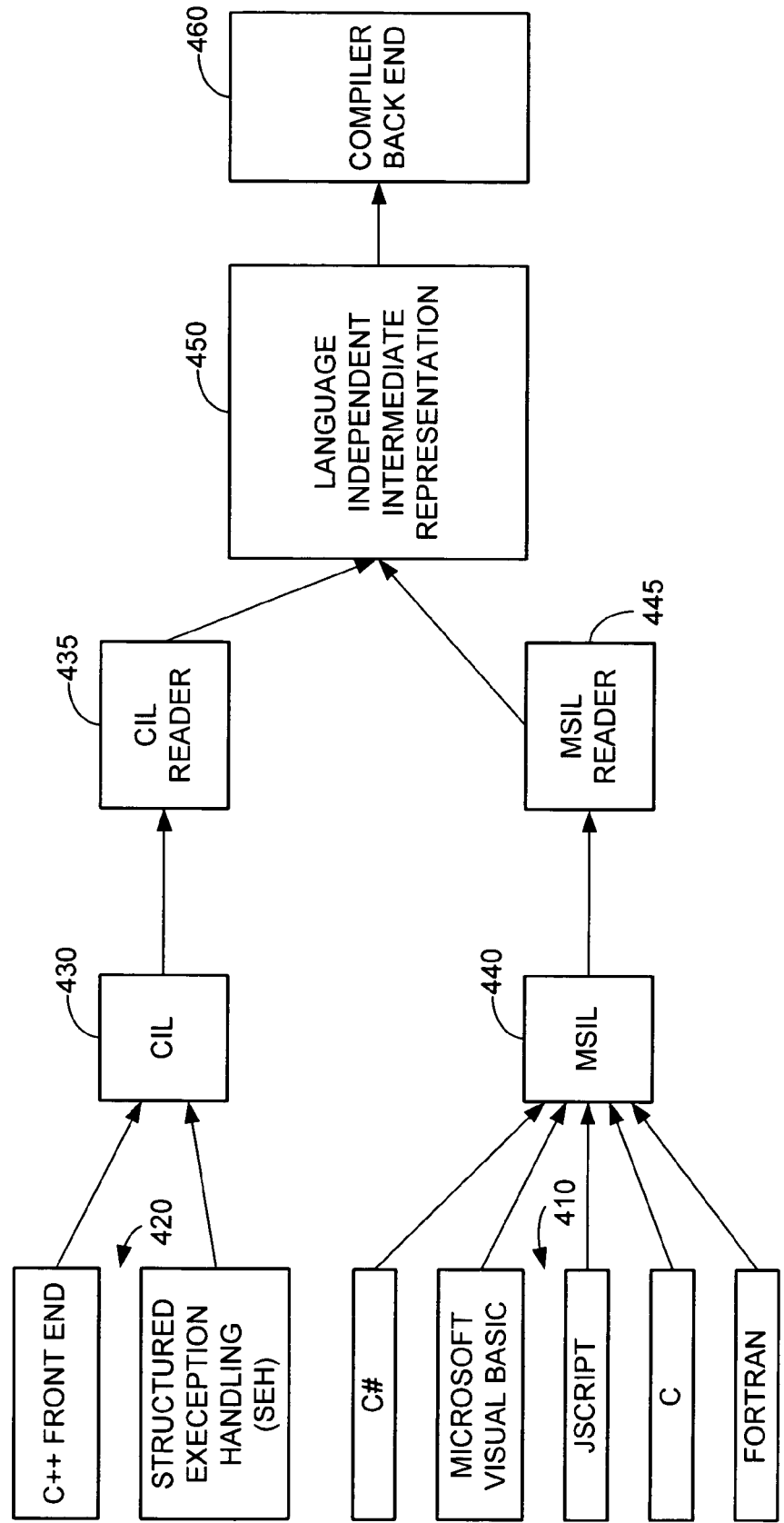
FIG. 4 is a block diagram of one embodiment of the system of FIG. 2 showing a multiple IL readers for CIL and MSIL languages.

FIG. 4 illustrates another embodiment of a system for generating a simple and uniform intermediate representation of exception handling constructs within multiple source languages expressed in form of multiple IL representations. As shown in FIG. 4, the source language group 410 supported within Microsoft's .NET framework (e.g., C#, C, Microsoft Visual Basic, Jscript, and FORTRAN) are first translated to a MSIL representation 440. However, because of its differences with other source languages C++ is expressed in another intermediate language known as CIL 430. The control flow and the exception handling models within the CIL and MSIL are expressed in fundamentally different ways and thus it may be necessary to provide separate IL readers (435 and 445) for CIL and MSIL representations.

Both the readers 435 and 445 may use appropriate algorithms implemented within their respective readers to parse or read their respective intermediate language code streams to express the exception handling constructs or instructions or expressions within the intermediate language code stream using a uniform framework of exception handling instructions 450 to be provided to the back end 460. Part of the rest of this document below describes various components of such a language independent exception handling instruction set. Furthermore, examples of exception handling constructs within the intermediate language are shown translated to their respective language independent intermediate representations. The document also describes algorithms and methods for parsing the intermediate language and generating the intermediate representations of exception handling constructs.

Exception Causing Instructions Explicitly Expressed within the Main Control Flow of the Intermediate Representation Exception causing instructions are guarded by their handlers or finally regions. When an instruction causes an exception the control flow may pass to a handler and sometimes the handler may be conditionally selected based on the processing of filter instructions. Control may flow to finally regions of code based on exceptions or directly, either way, it will be processed and used to implement clean-up code. Finally, regions are always executed before the control is exited out of the corresponding try region. This mechanism can be used for implementing clean up code, such as closing of file handles, sockets, locks, etc. FIGS. 8 and 12 illustrate pseudo code representing various exception handling related instructions. FIG. 12 for example shows a try region guarded by two catch blocks. The choice of which of the two catch blocks (in FIG. 12) is to be processed is dependent on the results of processing a filter block. As a further example, FIG. 8 shows a try region guarded by a finally block.

As described with reference to FIG. 3, the intermediate language representations with various models for expressing exception handling maybe analyzed to determine control flow between the exception causing instructions and their respective handlers and continuations, which may then be explicitly expressed within the same control flow as the rest of the instructions that do not cause exceptions. One way to accomplish this is to build a control flow representation using instructions with a modest memory allocation cost such as, one word per instruction. The handlers may be represented by instructions that use an exception variable which may be defined by an exception causing instruction. The handler or filter instructions can then test the exception variable and branch to the handler body or to another handler based on the value or type of the exception object. Similarly, instructions guarded by a finally clause in C++ or C# have control flow edges or pointers to instructions that capture the continuation for the target of the control transfer out of the finally region. The end of a finally region in this case may be modeled by an instruction that transfers control to the captured continuation at the start of a finally region. These features of the intermediate representation will be described in further detail below with reference to examples.

Format for Instructions

Figure 5:
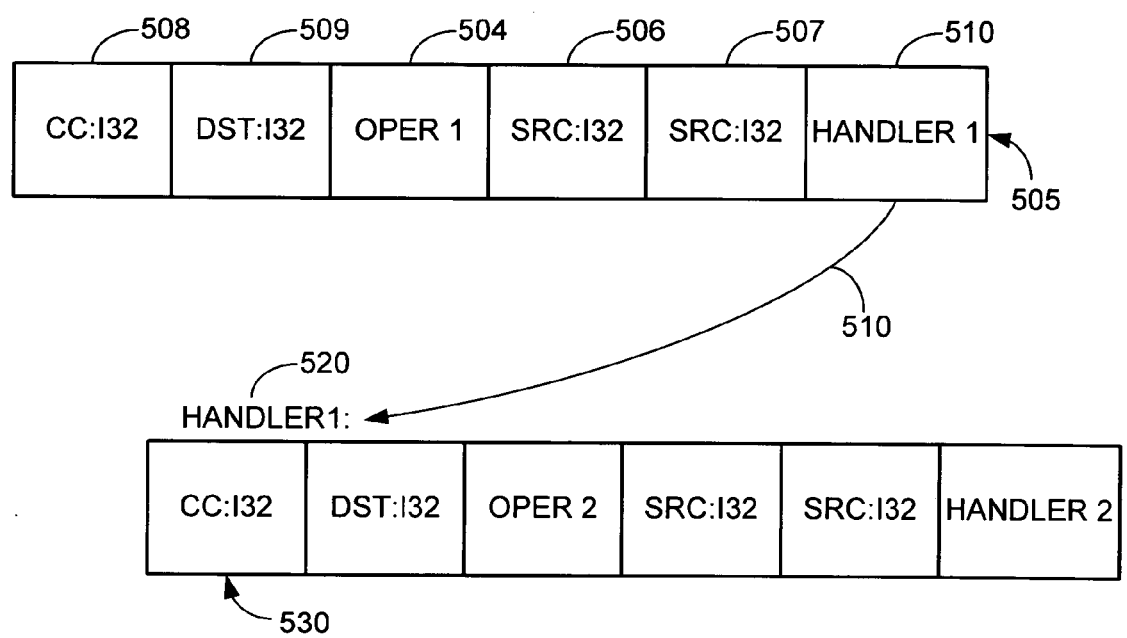
FIG. 5 is a diagram of one embodiment of a data structure for instructions in an intermediate representation.

As noted above, the intermediate representation of exception handling constructs in the intermediate language representation may be expressed at an instruction level. FIG. 5 shows one such general implementation of a data structure for instructions or nodes (IR nodes) that will allow the exception handling constructs to be expressed within the control flow of the intermediate representation of the rest of the code. Specific intermediate representations of exception handling instructions and their functionality is described later in the document. Generally, IR instructions may be executable at various levels within a compiler component hierarchy. They have an operator (op-code) field and a set of source (or input) operands, a set of destination (or output) operands. These operands are typically references to symbol nodes. In addition, each of the source and destination operands may be typed and the operator and the types of the operand may be used to resolve any ambiguity. In the example instruction of FIG. 5, the operator at 504 has two source operands 506 and 507 and two destination operands 508 and 509.

The exception handling semantics may be represented by providing, each instruction 505 with a handler field 510 that points to a label instruction 520 which is the start of the handler 530 for that instruction 505. If the instruction cannot throw an exception then the handler field 510 of the instruction is set to NULL. If the instruction can throw an exception but has no handler then the compiler may build a special handler to propagate control out of the current method.

A textual notation for describing the IR instruction 505 of FIG. 5 may be as follows:

CC, DST=OPER1 SRC1, SRC2; $HANDLER1

The handler label, if any, appears after the semi-colon. When the instruction does not throw an exception, the handler field is set to NULL. This may be either specified by the semantics of the instruction or found to be the case as a result of optimization or program analysis. In that case, the instruction may be textually denoted as follows:

CC, DST2=OPER1 SRC1, SRC2;

In cases where there is no destination operand or result for an instruction the destination and the "=" sign in the instruction description is omitted. For example, a conditional branch instruction does not have any explicit destination operands and its may be represented textually as follows:

CBRANCH SRC1, SRC1-LABEL, SRC2-LABEL;

Exception Handling Instructions

The following paragraphs describe the various exception handling related instructions of the intermediate representation by describing their operations, their inputs and outputs. Examples will illustrate how this instruction set can be used to generate an intermediate representation of exception handling constructs of various models within the same control flow as those instructions that are unrelated to exception handling.

TABLE 1

| | Unwind |
|---|---|
| UNWIND | Propagate control out of the current method |
| Syntax | UNWIND x |

An UNWIND instruction is used to represent control flow out of the current method when no matching handler for an exception is present. The unwind instruction is preceded by a label, and is followed by an exit out of the method. The source operand (x) of the UNWIND operation represents the thrown exception object. This makes the data flow explicit. There can be one or more unwind instruction in a method. However, having just one UNWIND per method allows for savings in intermediate representation space for each method. Also the handler field of an UNWIND instruction is usually set to be NULL.

FIGS. 6 and 7 illustrate the use of an UNWIND instruction in the intermediate representation. FIG. 6 shows the pseudo code for an unguarded region that may cause an exception. In the process of translating to the intermediate representation, the IL 220 reader will be parsing the code in an intermediate language (210-213) representation and not the pseudo code. However, the pseudo code is being used in these examples in order to simplify the illustration of the control flow. For example, in FIG. 6 the expression x=a div b may cause an exception if a divide by zero operation is attempted. Even if the original source code or its intermediate language representation (e.g., in MSIL or CIL) fails to specify a handler for this region the intermediate representation may provide a default handler which is usually an UNWIND instruction. Thus, an intermediate representation for the code of FIG. 6 may be as shown in FIG. 7. In the intermediate representation the exception causing instructions are shown with their handler fields 710 filled out and pointing to the handler with a label $HANDLER which marks the beginning of the UNWIND instruction. Now if an exception is caused the UNWIND instruction will move the control flow out of the method.

Finalization

The control flow to and out of a finally region may be represented in the intermediate representation by a set of instructions that are related, e.g., FINAL, FINALLY and ENDFINALLY. The FINAL instruction in general handles the explicit transfer of control to a finally region, whereas the FINALLY instruction can accept transfer from a FINAL instruction or through an exception causing instruction with a handler. The ENDFINALLY instruction represents the control flow out of a finally region.

TABLE 2

| FINAL | Branch to the start of a finally region |
|---|---|
| Syntax | FINAL Label, Continuation |

A FINAL instruction represents an explicit transfer of control to the start of a finally instruction. The first source operand of this instruction is the start label of the associated finally instruction, and the second operand is the continuation label where control is transferred after the finally region is executed. The handler field of a FINAL instruction is usually set to be NULL.

TABLE 3

| FINALLY | Accept control transfer from a final or exception handling instruction |
|---|---|
| Syntax | E, R = FINALLY |

A FINALLY instruction has two destination operands. The first operand is the exception variable. This models the data flow of the exception object. The second operand is a label or a code operand for the continuation that is captured. When a FINALLY instruction is executed as a result of an exception the captured continuation is the label of the lexically enclosing handler, FINALLY label or UNWIND instruction. This continuation label is reflected as the handler field of the matching ENDFINALLY (see below). The handler field of a FINALLY instruction is usually set to NULL.

TABLE 4

| ENDFINALLY | Leave the finally region and branch to the continuation or unwind |
|---|---|
| Syntax | ENDFINALLY E, R, [case-list]; $HANDLER |

An ENDFINALLY instruction has two or more operands. The first operand is the exception variable. The second operand is the continuation variable whose type is the type of a label or a code operand. It also has a case list that is used to represent possible control transfers for explicit final invocations in the program. An ENDFINALLY instruction must have its handler field set to the label of the lexically enclosing outer finally or handler (i.e., a FILTER or UNWIND instruction). If there is no exceptional control flow to the matching finally instruction then the handler field may be NULL. Furthermore, the destination operands E and R of the FINALLY instruction is the same as the source operands E and R of the ENDFINALLY instruction. This ensures data dependence between the two instructions which can be used by the back end components during code optimization.

FIGS. 8 and 9 illustrate an example of implementing a finally block from the IL representation to the intermediate representation using the FINAL, and FINALLY and END-FINALLY instructions. FIG. 8 illustrates the pseudo code of a try block. No handler is specified in the source code or its intermediate language representation. However, unlike the previous example no default handler needs to be specified because the expressions 810 are not exception causing instructions. Thus, control flows to the finally region only explicitly. The intermediate representation for the code of FIG. 8 may be expressed as shown in FIG. 9. The expressions 910 do not have handlers specified. The FINAL instruction 915 explicitly transfers control to the finally region indicated by the label $FINALIZE which points to the finally block 920. Once the finally block is executed, control transfers to the continuation label indicated in the FINAL instruction 915 which in this case is "$END."

FIGS. 10 and 11 illustrate translation of yet another try-finally block to an intermediate representation with FINAL, FINALLY and ENDFINALLY instructions. However, in this representation handlers are added to exception handling instructions. FIG. 10 shows the instructions 1010 which may cause exceptions that are guarded by the finally block 1015. FIG. 11 illustrates the intermediate representation of the try finally block along with exception handlers. The exception causing instructions at 1110 are assigned a handler label $FINALIZE directed to the beginning of the finally instruction at 1115. In this example, two types of control flows through the finally region is modeled. First, the FINALLY and the ENDFINALLY instructions are executed through an exception causing operation at 1110. In that event, after the ENDFINALLY instruction 1120 is executed, the control is passed to the region marked by the $PROPAGATE label. This in effect captures the continuation on the exception path. However, control flow to the finally region can also be transferred explicitly through the FINAL instruction 1112. In that event, at the end of the ENDFINALLY instruction 1120 the continuation is to the region marked by the $END region which does not implement the UNWIND instruction.

Yet another set of exception handling intermediate representation instructions for representing a finalization control flow may be referred to as the FAULT and the END-FAULT instructions. They are similar to the FINALLY and the ENDFINALLY instructions, however, unlike a FINALLY instruction control flow cannot be passed explicitly from FINAL instruction to a FAULT instruction. Control to the FAULT instruction is branched to only through an exception causing instruction.

TABLE 5

| FAULT | Handle a fault. |
|---|---|
| Syntax | E = FAULT |

The ENDFAULT instruction terminates a related FAULT handler and throws the exception to a specified handler. The handler field can be NULL if all exceptional control flow to the corresponding FAULT instruction has been removed. In that case the fault handler is unreachable and can be deleted.

TABLE 6

| ENDFAULT | Leave the fault region/handler and search for an exception handler. |
|---|---|
| Syntax | ENDFAULT E; $HANDLER |

Filter Based Handlers

Some intermediate languages (e.g., MSIL) implement a filter-based handler, whereby different handlers are assigned to exception causing events based on a characteristic of the exception causing event. Such control flow may be represented in a intermediate representation using instructions to catch and filter exceptions and then to specify handlers to exceptions (e.g., FILTER, ENDFILTER and TYPEFILTER). As described below, TYPEFILTER instructions may be a short form of the FILTER and ENDFILTER instructions.

TABLE 7

| FILTER | Catch and filter an exception. |
|---|---|
| Syntax | E = FILTER |

This instruction may be used to implement a general-purpose filter-based handler in MSIL. This matches any exception and simply returns the exception object in the destination operand of the instruction. The filter instruction is labeled, and is followed by an arbitrary sequence of instructions that may or may not use the exception variable. A filter instruction must eventually reach an ENDFILTER instruction without an intervening FILTER instruction. The handler field of a FILTER instruction is usually NULL.

TABLE 8

| ENDFILTER | Terminate a non-resumption filter. |
|---|---|
| Syntax | ENDFILTER X, handler-label, filter-or-unwind-label |

An ENDFILTER instruction tests a Boolean operand (X) and if it is 1, branches to the handler label otherwise it tries another filter or unwinds.

TABLE 9

| TYPEFILTER | Catch an exception of the given type. |
|---|---|
| Syntax | E = TYPEFILTER handler-label, filter-or-unwind-label |

A TYPEFILTER instruction tests if the type of the exception object is a subtype of the type of the destination operand (which is statically known). If so, control is transferred to the first label (the handler label). Otherwise, another filter or unwind instruction label is tried. When the type filter matches, the destination operand is set to the exception object. The handler field of a TYPEFILTER instruction is usually NULL.

Note that a TYPEFILTER instruction is a short form and in fact can be represented as a combination of both FILTER and ENDFILTER operations as follows:

```
t.obj32 = FILTER;
e.Type  = CHKTYPE t.obj32;
x.cc    = CMP(NEQ) e.Type, 0.null;
ENDFILTER x.cc, $LABEL1, $LABEL2;
```

The FILTER instruction returns an exception object whose type is verified to be of e.Type and if it is of e.Type then, x.cc is set to TRUE and to FALSE otherwise. Then at ENDFILTER, the continuation is determined to be $LABEL1 or $LABEL2 depending on the value of x.cc. The same expression can be represented as a TYPEFILTER instruction as follows.

e.Type=TYPEFILTER $LABEL1, $LABEL2;

FIGS. 12 and 13 illustrate the implementation of a try-catch block using the filter based exception handling instructions. FIG. 12 describes an exception causing try region 1210 being guarded by two different handler regions 1220 and 1230. Filters at 1215 and 1225 determine which handler to implement based on the type of the exception object returned. FIG. 13 illustrates an intermediate representation of the try-catch pairs using the TYPEFILTER instruction of the intermediate representation. The handler fields of both the exception causing instructions 1310 is set to $HANDLER1 which points to the first filter 1315. If the exception object is of the type DivideByZeroException, then control flows to the catch block labeled $CATCH1. If not then the control flows to the next filter 1325 referenced by the label $HANDLER2. Based on whether the type of the exception object is type Exception, control flows either to the second catch block 1330 identified by the label $CATCH2 or to UNWIND instruction 1335 identified by the label $PROPAGATE.

A MATCHANYFILTER instruction is a form of the filter based exception handling instruction.

TABLE 10

| MATCHANYFILTER | Match any exception type. |
|---|---|
| Syntax | E = MATCHANYFILTER handler-label |

This filter always matches any exception unconditionally, and transfers control to a valid label. This is equivalent to a FILTER-ENDFILTER pair where the first operand of the ENDFILTER is always 1 and the second label is not specified. The handler field of a MATCHANYFILTER instruction must be NULL. A MATCHANYFILTER instruction is also a short form and can be represented using FILTER and ENDFILTER instructions as shown below.

```
e.Type = FILTER;
ENDFILTER 1.cc, $LABEL1, $LABEL2;
```

The equivalent MATCHANYFILTER instruction for the FILTER and ENDFILTER combination above is as follows:

e.Type=MATCHANYFILTER $LABEL1;

Representing a Try Block Guarded by a Filter-Based Handler and a Finalization

Yet another exception handling model has the control flowing from a try block to one or more handler regions based on type of exception caused and then one or more finally regions. FIGS. 14 and 15 illustrate one such example. FIG. 14 shows the pseudo code for the intermediate language representation (e.g., MSIL) of a try block 1410 guarded by a pair of handlers 1420 and 1430 and a finally block 1440. Filters 1415 and 1425 determine which of the two handler blocks are processed based on the type of the exception object returned. Regardless of the catch block traversed, the finally block will have to be touched before exiting the method.

FIG. 15 illustrates an intermediate representation of the control flow shown in FIG. 14 using the filter-based TYPFILTER instruction and the finalization instructions of FINAL, FINALLY and ENDFINALLY. This example exhibits several interesting points that do not occur in the previous examples. First, each handler 1520 and 1530 is terminated by an explicit invocation of the finally instruction at 1521 and 1531 respectively. This reflects the semantics of the original program as shown in FIG. 14 where control flows from the handlers 1420 and 1430 to the finally block 1440. Second, the filter 1525 that controls the last handler 1530 specifies the label for the finally instruction and not the unwind instruction 1550. This ensures that if the last filter is not matched it transfers control to the proper finally block. This point will be further illustrated in the examples for the nested cases of exception handling as well.

FIGS. 16 and 17 illustrate nested exception handling. FIG. 16 illustrates the pseudo code for the intermediate language representation of a try-catch-finally block nested within a try part of the try-catch block. FIG. 17 illustrates the intermediate representation of such a exception control flow using the filter, handler and finalization instructions described above. As shown in FIG. 16, the outer try block 1610 is guarded by two handler blocks with filters at 1620 and 1630. The nested try block 1615 is guarded by a catch block 1625 with a filter and a finally block at 1635. There are several exception paths possible here based on several factors including where within the source code the exception occurs. All these various exception paths can be expressed using the intermediate representation exception instructions as shown in FIG. 17. The exception causing instruction 1705 is guarded by the outer filter-based handler block labeled $HANDLER1 1710 which may pass control on to yet another filter-based handler block labeled $HANDLER2 1715. The exception causing instruction 1706 that is within the inner try block 1615 is guarded not only by the inner filter-based handler block labeled $HANDLER3 1720 but its exception path may also pass through the block labeled $HANDLER1 at 1710 and/or $HANDLER2 at 1715. For example, if a DivideByZero exception is caused at the expression within the inner try block at 1706 then the exception path reaches the appropriate handler block at 1710 though the finalization block at 1725 by setting the handler field of the ENDFINALLY block at 1726 to the $HANDLER1 label. This flow represents the flow from try block 1615 to finally block 1635 and then to handler 1620.

A Method for Translating Exception Handling Constructs from Intermediate Language Code to a Lower-Level Intermediate Representation As shown in FIG. 2, the intermediate representation of the exception handling construct using the instructions described above may be generated by an IL reader 220 which processes code in a intermediate language to generate such a representation. A IL reader 220 may use any number of different processes or algorithms and the choice or design of the algorithms may be dependent in part on the intermediate language itself and more particularly its model for representing exception handling constructs. For example, FIG. 4 shows an IL reader 445 suited for reading the source code representation in the MSIL intermediate language and generating a intermediate representation using the exception handling instructions described above.

Figure 18:
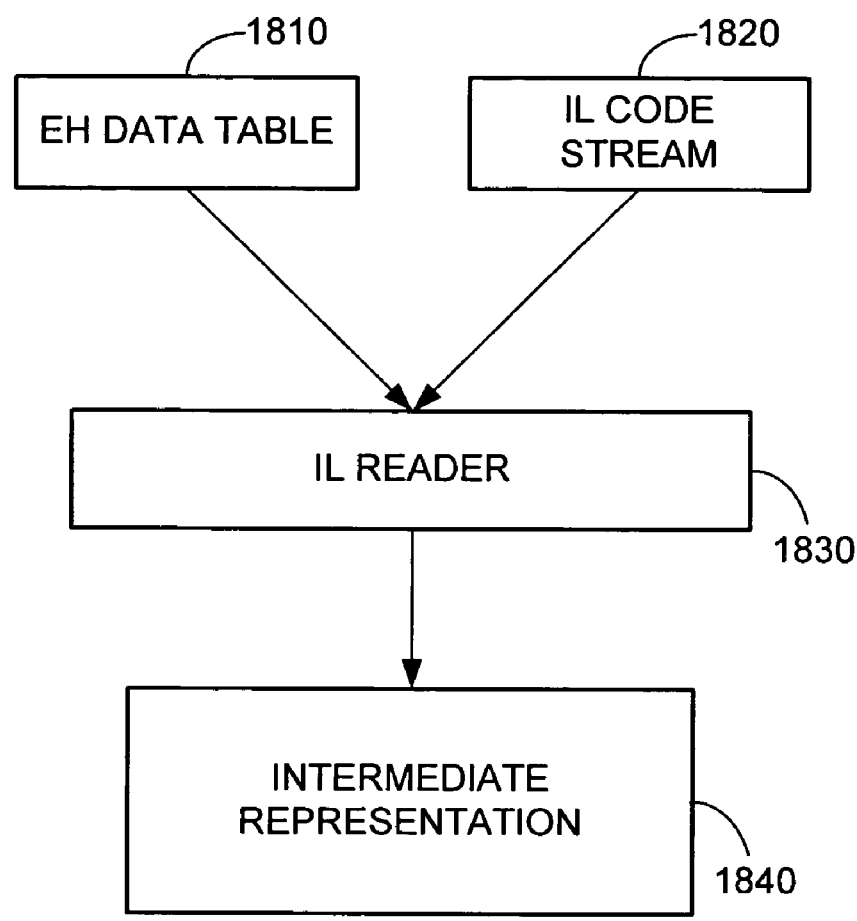
FIG. 18 is a block diagram illustrating one method for translating exception handling constructs from an intermediate language to another intermediate representation.

FIG. 18 illustrates one possible method for generating an intermediate representation of exception handling instructions. In some intermediate languages (e.g., MSIL) exception data may be captured within a data structure separate from the main code stream. The IL reader (translator) for such languages may receive as input an exception handling data table 1810 and the main code stream in the intermediate language form 1820. Such data may then be read by an IL reader at 1830 to determine the relationship between exception causing instructions and any catch, finally or filter blocks associated with such instructions to generate the intermediate representation at 1840.

For example, FIG. 19A illustrates a data table containing exception handling data that may be available as part of an intermediate language representation of source code. The data shown in FIG. 19A corresponds to the code segment illustrated in FIGS. 12 and 13. As noted above, for sake of simplicity, FIG. 12 only shows the pseudo code of the intermediate language representation. However, the IL reader will in fact be parsing or reading the intermediate language code such as MSIL. The offsets 1240 to various instructions may be noted as shown in FIG. 12. The IL reader will be aware of the offset pairs enclosing distinguishable blocks of code. For example, the exception handling data of FIG. 19A notes the offset entries for the try block 1210 at 1910, a type of block that it is (e.g., try-catch, try-finally, try-catch-finally etc.) at 1915 and the offset entries for its handler blocks at 1920. Similarly, the offsets entries for the finalization blocks, filter blocks, continuation blocks and other blocks on the exception paths of instructions and their relationships to each other may be noted in form of offset entries as shown in FIG. 19A.

Figure 20:
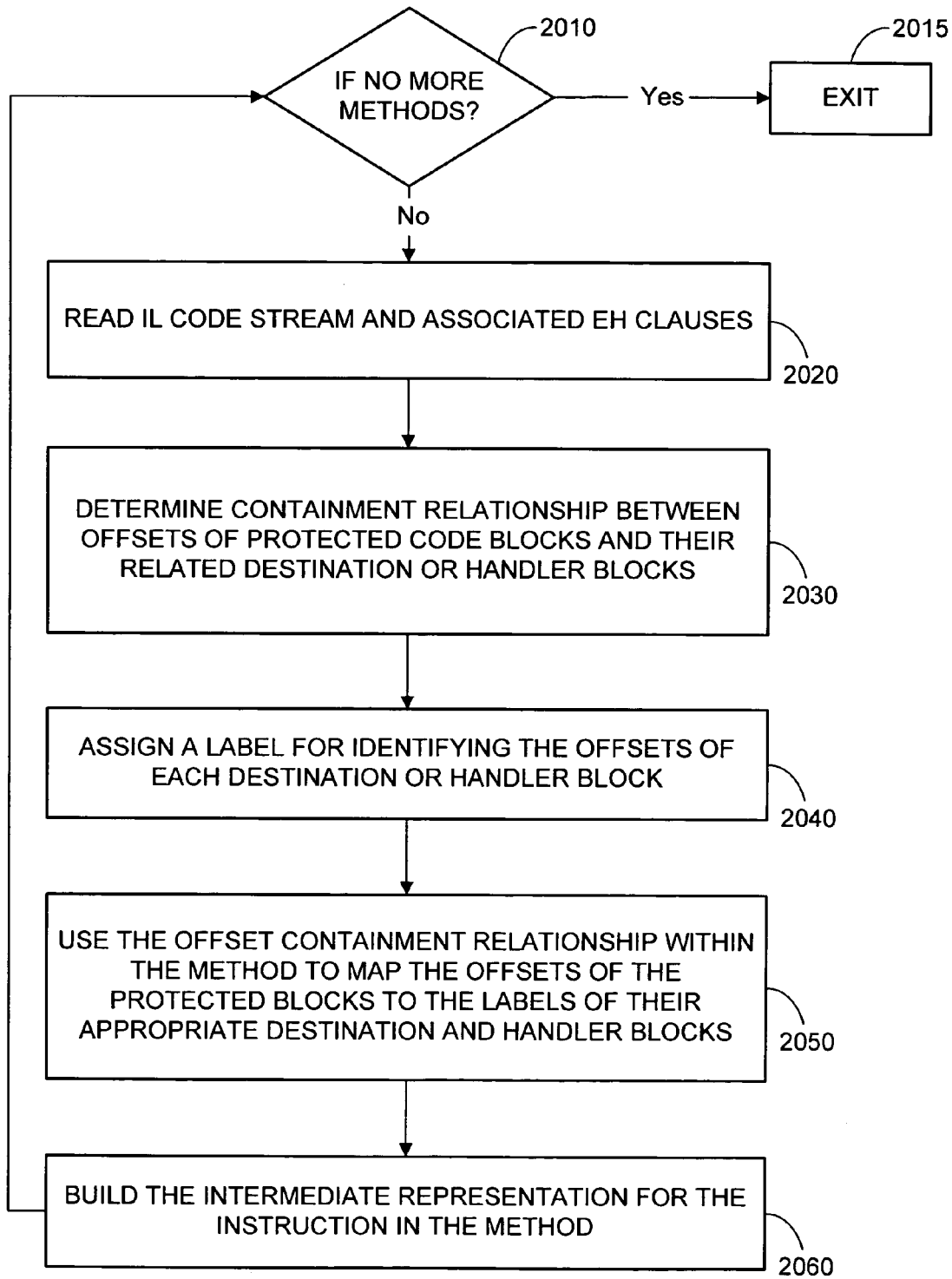
FIG. 20 is a flow chart of one method for using the exception handling data table and the containment information between protected blocks and their handlers and destination blocks for generating an intermediate representation.

However, as noted above, the exception instructions of intermediate representation uses labels to mark or identify various cohesive blocks of code and these labels are used to build the intermediate representation along with the control flow. Thus, IL reader uses the exception handling data tables such as the one shown in FIG. 19A to generate the labels for building the intermediate representation. FIG. 20 is one example of a method for processing input in the form of an intermediate language code including captured exception handling data which is used to generate an intermediate representation. At 2010, if there are no more methods to be parsed or read within the code the translation process is stopped at 2015. If not, the current method and its associated exception handling data table are read at 2020. At 2030, the exception handling data including the offset ranges for each block of code is used to establish a containment relationship between the blocks of code that may be protected and the blocks of code that form its handlers, filters, finalization, continuations blocks etc.

Figure 21:
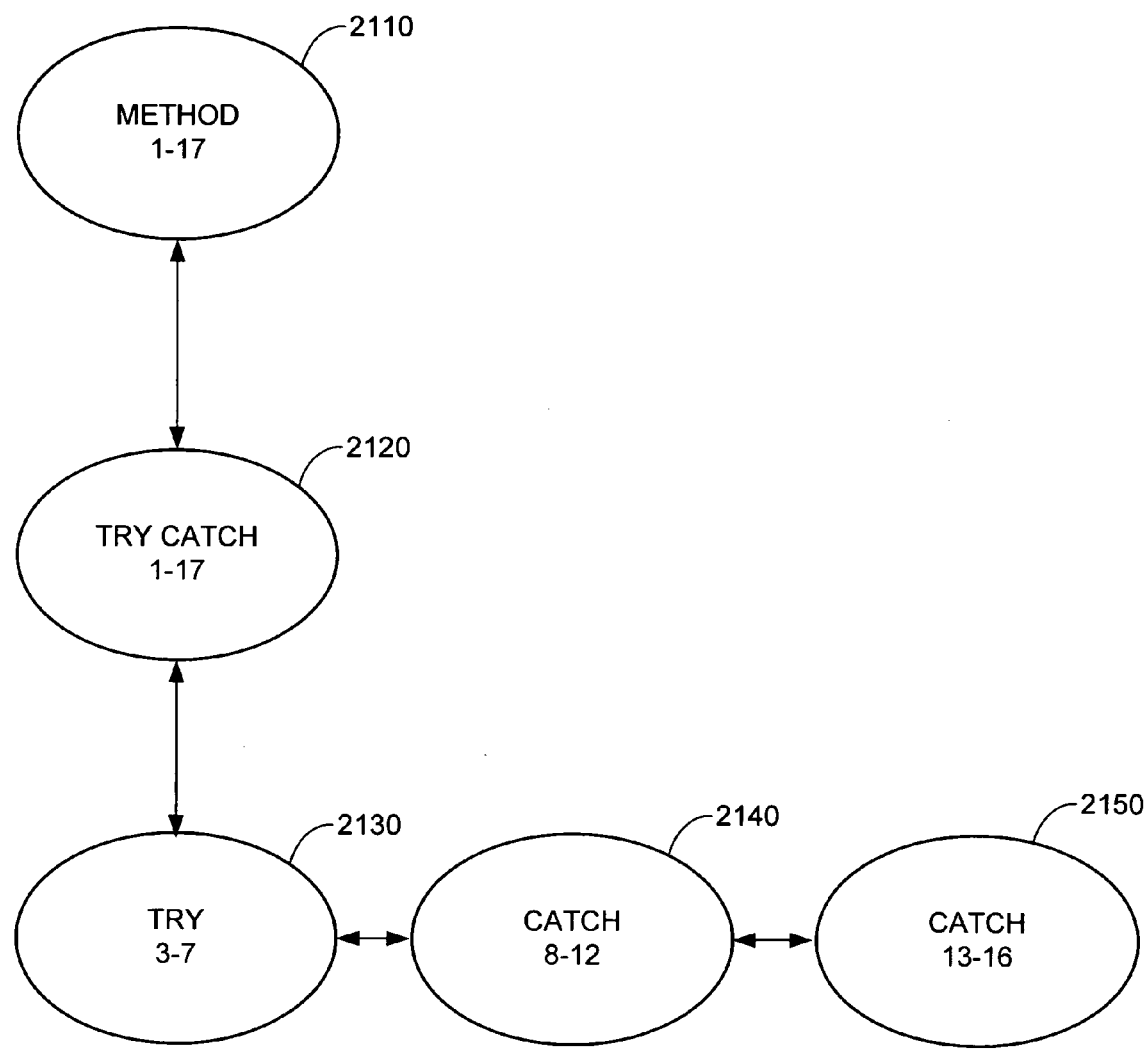
FIG. 21 is a diagram showing one example of a range tree map for determining the containment relationship between the protected blocks and their handlers and destination blocks.

For example, FIG. 21 illustrates building a tree data structure to map the containment relationship between the various blocks of code shown in FIG. 12. First, the offset belonging to the entire method 2110 is assigned a node on the tree. Then as each offset range in the exception handling data (FIG. 19A) is read they are assigned other relationships such as which ranges are guarded by which handlers based on the information provided by the exception handling data. For example, Try-Catch offset range 2120 is shown as containing the Try range 2130 that is guarded by two handlers the first Catch at 2140 and a second Catch at 2150. This example shows a single case of a try-catch block within a method but the tree structure can get much larger as multiple blocks of code are nested within each other and the tree structure provides a suitable way to represent such multiple containment relationships.

Returning now to FIG. 20, as the containment relationship between various blocks of code is established (2030), at 2040, each of the handler and destination blocks (e.g., finally or continuation, etc.) which may be identified only by their offset ranges can now be assigned distinctive labels. For example, FIG. 19B illustrates the labels $HANDLER1 and $HANDLER2 being assigned to the two handler blocks identified in the code of FIG. 12. Returning again to FIG. 20, at 2050, using the containment relationship of the various blocks of code the protected blocks are assigned labels to their handlers and destination blocks as shown in FIG. 19C. This allows the expression of the relationship between the protected blocks and their associated handlers and destination block in form of labels in the intermediate representation expressions described above. Once the protected blocks are mapped to their appropriate handlers and other destination blocks, at 2060, the intermediate representation for the method is built by parsing the code again. In this pass, each instruction is read, and if it is an exception causing instruction, its handler is identified using the range tree data structure built earlier. This process may be repeated until all the methods within a program are translated to their intermediate representation.

Intermediate Representation of Object Construction and Destruction as Try-Finally Blocks Some languages such as C++ allow a programmer to declare object (class) variables that have local lifetimes within blocks or expressions where they are declared. The language semantics requires that the corresponding object destructors be called when the block scope or the expression scope is exited. These operations can be represented within the intermediate representation as one or more sets of try-finally blocks. For example, FIG. 22 illustrates a program using local objects. Statements S1 and S3 generate a call to the constructors for class1 and class2, respectively. The constructors for these classes and the statements S2 or S4 calling on these objects might throw an exception. In that event, appropriate cleanup might be necessary. If statement S1 throws an exception, the exception is propagated because no object has yet been successfully created. If S2 or S3 throws an exception, the destructor for class1 needs to be called. However, if S4 throws an exception the destructor for class2 needs to be called followed by the call to the destructor for class1. Since this example does not have a handler, the exception is propagated to the caller of the method. These operations may be expressed, conceptually, by the nested try-finally construct shown in FIG. 23. The constructor for obj1 2310 is outside any of the try blocks. Thus, if an exception is thrown during the constructor 2310 no objects need be destructed prior to exiting the method. However, if obj1 is successfully constructed at 2310 then it has to be destructed passing through the finally block at 2320. However, if control reaches the inner try block at 2330 then both obj1 and obj2 have to be destructed by passing through both the finally blocks 2320 and 2340. The intermediate representation using the FINAL, FINALLY and ENDFINALLY instructions for these operations may be as shown in FIG. 24. The two FINAL instructions 2410 and 2420 provide the explicit entry to two sets of FINALLY and ENDFINALLY instructions represented at 2430 and 2440 respectively. Control flow may reach these instructions through exceptions as well in the event an exception is caused during destruction of the second object. The destructor instruction for the second object at 2435 has a handler label ($DTOR1) pointing to the FINALLY and ENDFINALLY instructions 2440 containing the destructor for the first object at 2445. This is so because if control flow has reached the destructor 2430 of the second object, then necessarily the first object must have been constructed and so has to be destroyed before the method is exited. Even if there are no exceptions thrown when destructing the second object, the first object will still be destructed at 2440 ($DTOR1) prior to exiting the method.

Intermediate Representation of Expression Temporary Objects

Some languages such as C++ allow creation of expression temporary objects. These objects are created during expression evaluation and are destroyed after the expression evaluation, typically after the evaluation of the statement containing the expression. If the expression is a conditional expression, then objects created have to be destructed conditionally. For example, FIG. 25 shows expression temporaries obj1(x) and obj2(x+1). The destructors for these objects have to be called after the call to foo( ). However, note that the creation of these objects occurs conditionally depending on the value of the variable "x." Thus, the destructor instructions for these objects also have to be guarded by the same condition. This may be expressed as a set of nested try-finally blocks as shown in the pseudo code of FIG. 26. Depending on the value of "x" obj1 or obj2 is created at 2610 and 2620 respectively. Thus, based on the same condition obj1 or obj2 have to be destructed at 2630 and 2640 respectively. Unlike the previous example, here only one object is created at any given time. FIG. 27 illustrates one intermediate representation for this construct using multiple sets of FINAL, FINALLY and ENDFINALLY instructions described above. Depending on the value of "x", a branch instruction 2710 points to the code for the constructor of obj1 at 2720 or to the code for the constructor of obj2 at 2730. Also note that if an exception is thrown during the creation of either of the objects at 2720 or 2730 the handler label is set to $PROPAGATE (2721 and 2731) which marks a UNWIND instruction to pass the control outside of the method. Then again depending on the object created, either obj1 is destructed at 2740 or obj2 is destructed at 2750 both such destructors are contained within a pair of FINALLY and ENDFINALLY instructions. In this manner, conditional creation and destruction of expression temporary objects may be represented using intermediate representation instructions.

Intermediate Representation of the Returning of Objects by Value

Some languages such as C++ permit returning objects by value. Before returning the object, destructors are called on the locally created objects. For example, in FIG. 28 objects a and b are locally created at 2810. If the destructors on any of these local objects throws an exception, then the return objects r1 at 2820 and r2 at 2830 should be destroyed before exiting the method. The exception handling control flow for the code in FIG. 28 may be expressed in the intermediate representation as shown in FIGS. 29A and 29B. Before returning the object r1 at 2910, the method has to call the destructors of locally created objects a, and b at 2920 and 2930, respectively. However, if any of these destructors 2920 or 2930 throw an exception, then the destructor of the return object 2940 has to be called. Such a control flow may be represented as shown in FIG. 29 using the appropriate sets of FINAL, FINALLY and END FINALLY instructions. For example, the handler label ($final_a1) of the destructor of object b at 2930 points to label for the destructor of object a 2920 whose handler label ($final_r1) in turn points to destructor of the return object r1 at 2940. This ensures that if there is an exception caused during destruction of objects a or b or both, the return object r1 is also destructed before exiting the method. Note that at 2940, the destructor for r1 is called if the flag $F1 is equal to "1", which is set to "1" at 2950 and remains set to "1" if the either object a or object b could not be successfully destroyed. In this manner, return object r1 is destructed if destruction of object a or b is unsuccessful. The conditional destruction of the return object r2 is handled in the same manner.

Intermediate Representation of the Throwing of Objects by Value

Some languages such as C++ permits throwing and catching objects by value, i.e., values allocated on the stack. Simple primitive values like type "int" do not pose any issues. However, throwing structs and classes allocated on the stack may require calls to constructors and destructors. FIG. 30 illustrates source code for throwing an object by value. Conceptually, the operation may be represented in the pseudo code as shown in FIG. 31. In this example, a copy of the local value is made and the copy constructor 3110 is called on the copy. When the value is thrown at 3120 the destructor for the new copy of local value has to be passed so that method receiving the value can call the destructor at a later time. A finally block 3130 guards all exceptions and is responsible for calling destructors.

The try-finally block may be represented in the intermediate representation as a set of FINAL, FINALLY and ENDFINALLY instructions and following instruction may be used to represent throwing of value types which have copy constructors and destructors defined for them within the copy instruction.

TABLE 11

| THROWVAL | Throws a value type as an exception |
|---|---|
| Syntax | THROWVAL E, Dtor; $HANDLER |

This is a special form of throw that is used to throw value types which have copy constructors or destructors defined for them. It has two operands. The first operand is a pointer to the location that has the value being thrown, and the second operand is a function pointer that performs the destruction. The semantics of this is that the thrown object is destructed when a handler is found. This essentially keeps the local value type location live at runtime. This may be used to model the C++ exception semantics for value types. The handler field of a THROW instruction is usually not set to NULL. FIG. 32 illustrates an intermediate representation of the code of FIGS. 30 and 31. The THROWVAL instruction 3210 is used to represent value throwing and in this example, it is shown receiving the pointer to the location of the value being thrown 3220 and the pointer to its destructor 3230 to be used later by the methods receiving the thrown object.

Intermediate Representation of a Try-Except Construct

Structured Exception Handling (SEH) extensions to languages such as C and C++ provide an exception handling construct expressed as a try-except block. FIG. 33 illustrates a try-except block. Like a catch block with a filter, an except block specifies pointers to handlers of an exception causing instruction based on the type of exceptions caused. However, except blocks also allow for the possibility of resuming the execution of an instruction that caused the exception. The following two intermediate representation expressions may be used to represent such an exception control flow.

TABLE 12

| SEHENTER | Enter an SEH guarded region. |
|---|---|
| Syntax | SEHENTER $HANDLER |

An SEHENTER instruction marks an entry to a try-except region. Its handler specifies a control dependency to the handler and the body of the guarded region.

TABLE 13

| ENDRESUMEFILTER | Terminates a resumption filter. |
|---|---|
| Syntax | ENDRESUMEFILTER X, handler-label, filter-or-unwind-label, resume-label |

An ENDRESUMEFILTER is similar to an ENDFILTER except that it may cause the execution of the exception causing instruction to be resumed when the source operand has a value of −1. FIG. 34 illustrates an intermediate representation for the try-except construct of FIG. 33 using the SEHENTER, FILTER and ENDRESUMEFILTER expressions described above. At 3410 the SEHENTER instruction is used to prefix the call to the body of try 3420. Also, to ensure proper control dependencies among the operations in the try-except region the handler to the SEHENTER expression is set to the FILTER instruction 3430 as is the call to the exception causing instruction foo( ) at 3420. The ENDRESUME instruction is used to denote the continuations of the exception path based on a value returned by the filter function 3450. If the value "t" is 1, then the control passes to the handlerbody ($HANDLER-BODY). If the value is "0", then the method is exited. However, if the value of t returned is "−1" then control returned to $LABEL to resume the execution of the operation that caused exception in the first place. Also, the representation of FIG. 34 provides one exception path, which has an exit directly from the SEHENTER instruction 3410. This ensures that only safe code-motion is done. In the same representation, however, the call to the filter function at 3450 does not have a handler but a handler such as an unwind instruction (not shown) may be set if the filter( ) function is likely to cause an exception.

An Alternative Method for Translating an Intermediate Language Representation of Exception Handling Constructs from Intermediate Language Code to a Lower-Level Intermediate Representation As noted in FIG. 4, a separate IL reader may be necessary for generating the intermediate representation from different intermediate languages (e.g., CIL, MSIL etc.) in order to conform to the exception handling models specific to that particular language. The following section describes a method for generating an intermediate representation of exception handling constructs from a language that expresses operations in form of post fix notation as does CIL.

Generally, in post-fix notation expressions, the operands of an operation are expressed before the operator is expressed. For example, in the code for an ADD operation such as T=5+3, a reader will encounter the code for the operands 5 and 3 before encountering the code for the operator "+" (i.e., ADD). A translator for such code, which uses a post-fix notation form and more particularly, one capable of translating such code in one pass may translate the code for the operands first, and then build the translated code for the entire operation based on the code for its operands or its children nodes (also referred to as sub-expressions of an expression).

Figure 35:
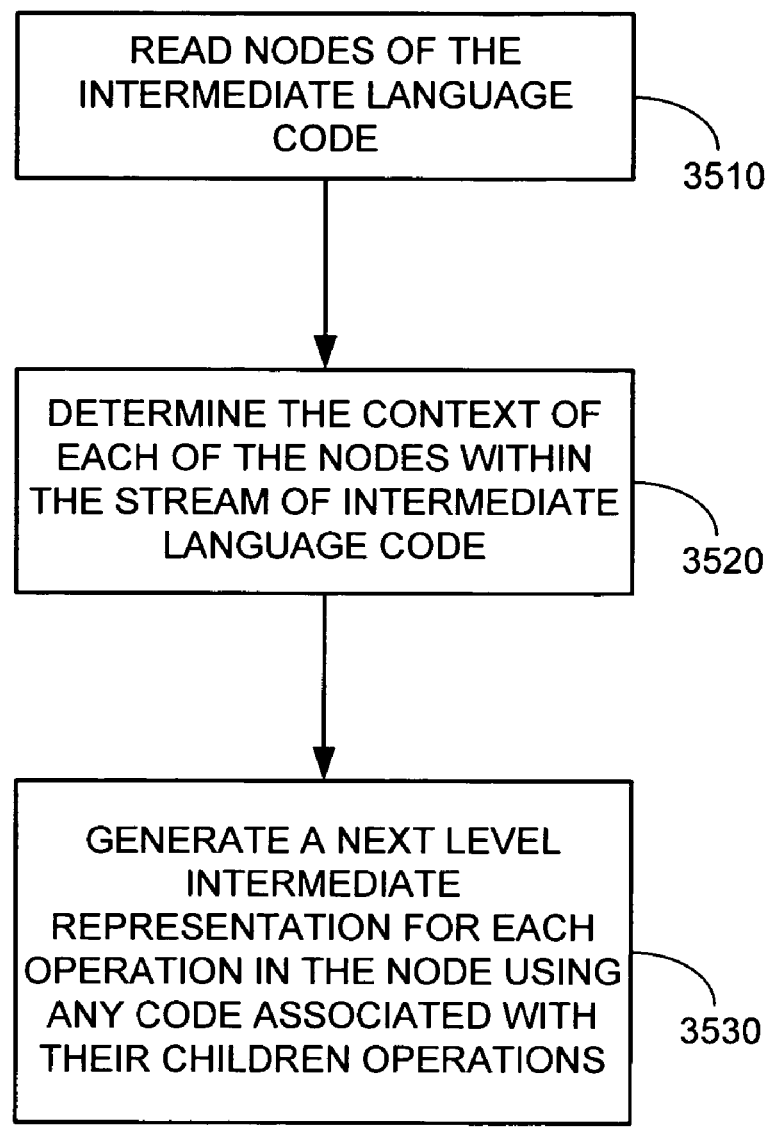
FIG. 35 is a flow chart of an exemplary method for translating an intermediate language expressed in post fix notation form to another intermediate representation.

FIG. 35 illustrates one overall method for generating an intermediate representation of exception handling constructs from an intermediate language that uses post fix notation such as CIL. At 3510, the input code is read node by node (i.e., expression by expression). Then at 3520, because of the recursive nature of the post fix notation form a context for current node within the rest of the code stream is determined. This context can later be used at 3530 to put together the code for parent nodes based on the code for their children nodes.

Figure 36:
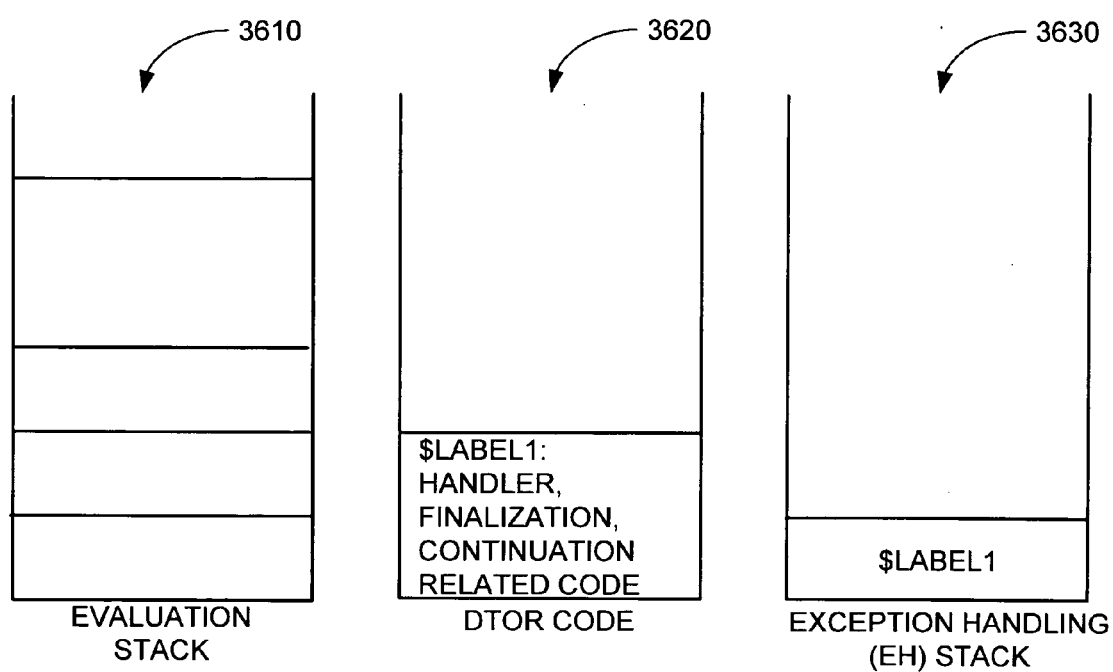
FIG. 36 is a diagram of one implementation of data structures to build an intermediate representation from reading code expressed in a post fix notation form.

Post-fix notation language may express exception information in form of operations using selected operators, which may be processed by an IL reader in the manner of FIG. 35 to generate the intermediate representation in form of the uniform framework of instructions (e.g., FINAL, FINALLY, and ENDFINALLY). FIG. 36 illustrates one way of implementing the method of FIG. 34. FIG. 36 shows several data structures (e.g., 3610, 3620, 3630) to serve as building blocks for containing the translated intermediate representation code which can later be combined to together complete the intermediate representation form for a code section such as a method. The data structures 3610 and 3630 may be implemented as conceptual stacks with their own nodes having their own data structures. As the code in the intermediate language form (e.g., CIL) is read and translated the intermediate representation code related to each sub-operation, sub-expression, child node etc. may be stored within the data structures (e.g., 3610, 3620, 3630). Then as the context or containment relationship for each operation is established or at other appropriate times all the translated intermediate code is added together to generate the complete translation.

In one such method, nodes read from intermediate language input are pushed on to the evaluation stack 3610 where they may be evaluated. The evaluation of a node read from the input may require popping of some nodes from the evaluation stack or EH stack, and pushing new nodes onto the evaluation stack or EH stack. Generally, the evaluation stack 3610 may contain intermediate code related to most of the main code stream. Some nodes from the evaluation stack may be then popped off the stack to build code for other nodes as the context or containment relationship of the parent and children nodes are established. For example, getting back to the simple add expression T=5+3, when its established that 5 and 3 are operands for the "+" operation, the nodes on the evaluation stack 3610 related to the constants 5 and 3 are popped and the code for the add operation can be synthesized by composing the code of its children, namely nodes representing 5 and 3. The translation algorithm uses and maintains the invariant that nodes on evaluation stack have all attributes computed.

The DTOR code data structure 3620 may be thought of as a structure for encapsulating the translated intermediate representation code sequences for all object destructors, catch blocks, and finally blocks that appear in the body of a method. The exception handling (EH) stack 3630 is not used to contain code sequences, as such, but may be thought of as a stack of continuations used to establish the relationship between the various sequences of code by building labels. The EH stack establishes the nesting relationship among try, catch and finally regions. Each region can be identified by the label associated with the region. Each node in the EH Stack has a unique ID called the state. The notion of state is used to compute the number of objects allocated in an expression evaluation. This information can be used later for such things as determining the number of destructors that need to be added to the translated code and their relationships to the rest of the code.

The data structure for each of the nodes on the evaluation stack 3610 may be as shown below.

TABLE 14

| Field | Description |
| --- | --- |
| Opcode | IL opcode of the node |
| IL Type | The IL Type of the node as provided by the front end of the compiler |
| Opnd | IR data structure representing the Opnd that is the result of evaluation of the node. This field is empty when the node is read and the evaluation of the node computes the Opnd field. |
| EHStart | Integer representing the top of EH stack when node was read |
| EHEnd | Integer representing the top of the EH stack when the node is evaluated. The difference between EH Start and EH End numbers gives the nodes that were pushed onto EH Stack during the evaluation of the expression. It is used for generating Finally regions of expression temporaries of conditional expressions. |
| FirstInstr | Points to the beginning of the translated code sequence related to the node |
| LastInstr | Points the ending of the translated code sequence related to the node |

Only the "Opcode" and the "IL Type" fields may be provided by the front end of the compiler the rest of the fields are filled during the translation process as the intermediate representation code is generated. The FirstInstr and the LastInstr fields will allow the concatenation and pre-pending of code. The entire DTOR code data structure 3620 may be implemented similar to the data structure of one node of the evaluation stack 3610.

The EH stack nodes may have the following data structure for representing the continuations on the exception path.

TABLE 15

| Field | Description |
| --- | --- |
| Label | A label to a finally block or a catch block |
| Flags | Flags representing the EH flags |
| State Type | Represents state type |
| State Id | Represents the EH state id |

The label field points to a label instruction that can precede a Finally, or TypeFilter instruction. The flag field may be used to identify the characteristics of the exception handling operations being performed. For example, it may be used to identify whether destructor code to be translated is for a temporary object such as an expression temporary or whether it is for an object that can be destructed outside of the expressions within which it is constructed.

Figure 37:
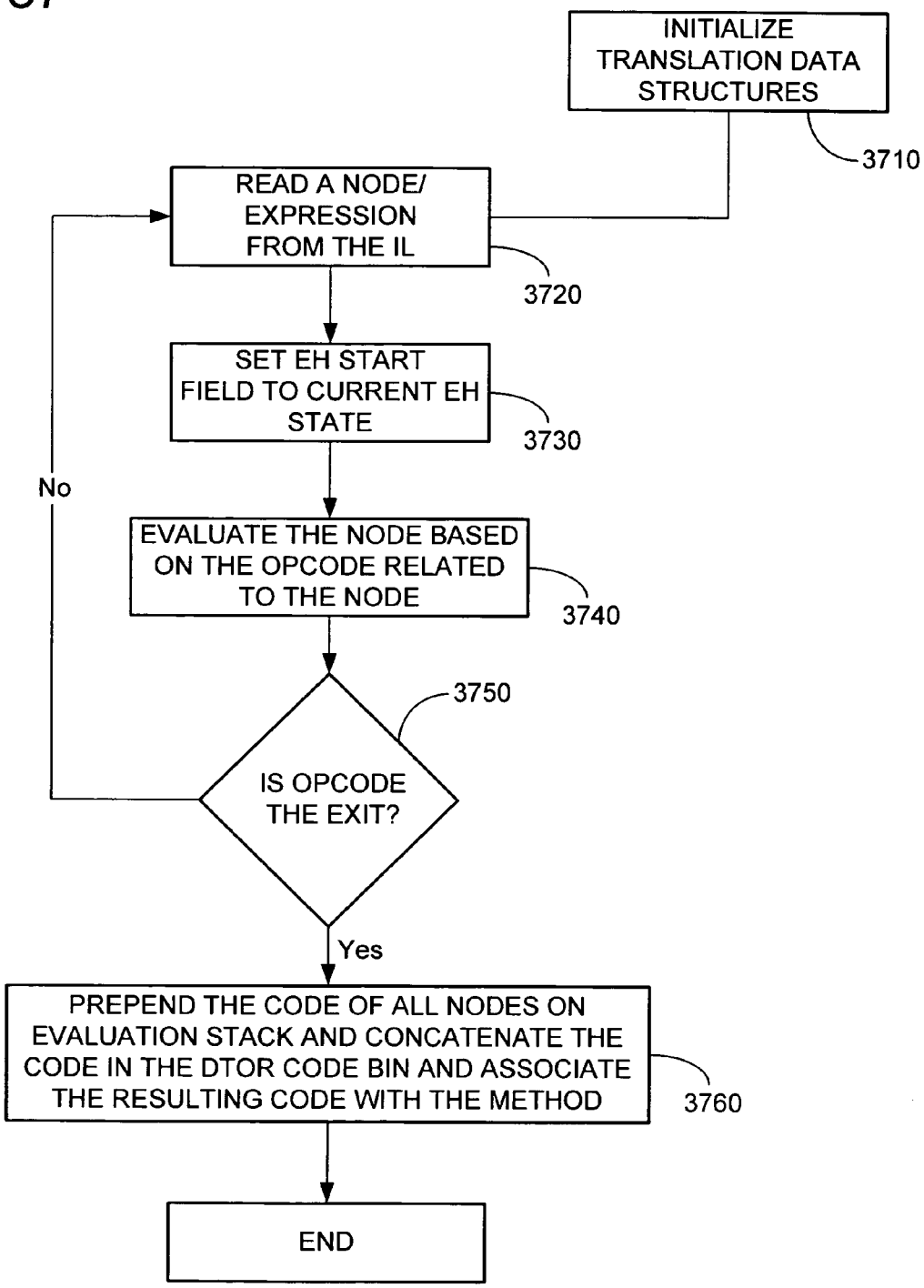
FIG. 37 is a flow chart showing an exemplary method for using the data structures of FIG. 36 to build an intermediate representation by reading code expressed in post fix notation form.

Within the context of the data structures for the nodes of the evaluation stack 3610, DTOR code 3620 and the EH stack 3630 a method for generating intermediate representation as shown in FIG. 35 may be described in further detail as shown in FIG. 37. The method of FIG. 37 is implemented for each method within the intermediate language stream being translated. At 3710, the translation data structures shown in FIG. 36 (e.g., 3610, 3620, and 3630) are initialized. For example, the evaluation stack 3610 and the EH stack 3620 are initialized to be empty. Also, an UNWIND node may be pushed on to the EH stack because all methods will at least have one exception path continuation to the outside of the method and the current state of the EH stack may also be initialized. Later at 3720 a node from the intermediate language code is read and its EH state is initialized to the CurrentEHState. Again, states are used to maintain the context of the code being read recursively. Later at 3740, the node is evaluated within the existing context of the evaluation stack and the EH stack. The result of evaluation is the definition of Opnd, FirstInstr and LastInstr fields of the node and a change in the context, (i.e., nodes can be pushed or popped of the evaluation stack or EH Stack and value of CurrentEHState can be modified). Nodes on the evaluation stack represent the evaluated nodes, which have their fields completely filled. Then at 3750, if the operation being evaluated is not an exit the next node is read. However, if it is the exit of the method then at 3760, the translated code contained within all the evaluated nodes on the evaluation stack 3610 are prepended and the code within DTOR code data structure 3620 is concatenated to this result to yield the complete intermediate representation code.

An Example Translation of Intermediate Language Code in Post-Fix Notation to a Lower Level Intermediate Representation The method of evaluation 3740 may be different for different operations as they are encountered during the process of reading the intermediate language code. The following example illustrates the method for evaluating some such operations in intermediate language code. FIGS. 22 and 23 illustrate the pseudo source code for object constructors and destructors in a language such as C++. FIG. 24 illustrates the code of FIGS. 22 and 23 translated to the intermediate representation using the instructions such as FINAL, FINALLY, ENDFINALLY. The post-fix notation intermediate language code being processed by the IL reader (i.e., translator) may be in the form shown in FIGS. 38A, 38B and 38C. Such code may be read and translated to the intermediate representation (FIG. 24) using the methods described above with reference to FIGS. 36 and 37.

Figure 39:
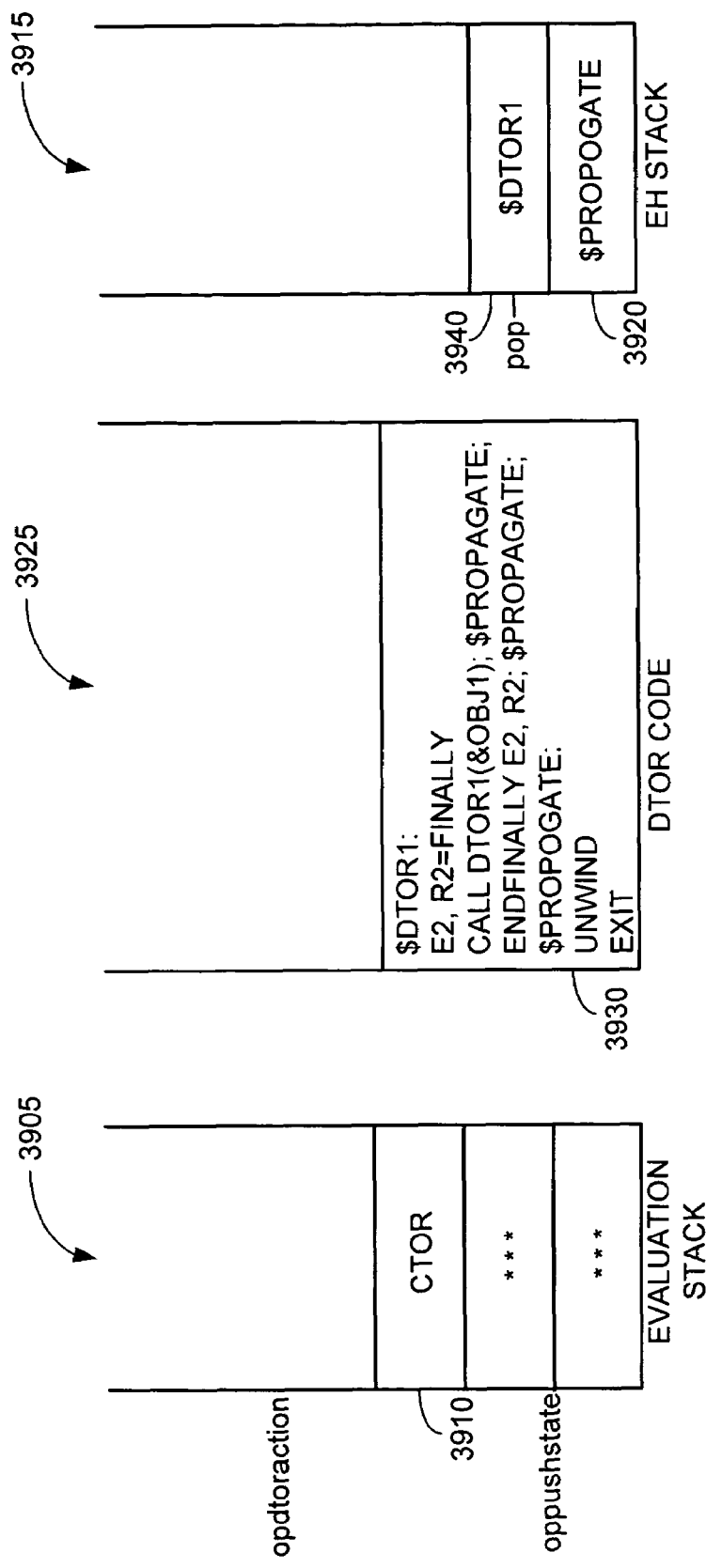
FIG. 39 is a block diagram illustrating the state of data structures of FIG. 36 during the translation of the code of FIG. 38 to an intermediate representation.

FIG. 39 illustrates the process of translating the intermediate language code of FIGS. 38A, 38B and 38C containing object constructors and destructors using translation data structures (e.g., 3905, 3915, 3925). At first, all the data structures are initialized to be empty. Then as the code in FIGS. 38A, 38B and 38C is read each operation is evaluated and nodes are pushed on to the evaluation stack 3905 or popped to generate code within the DTOR code data structure 3925 and to manipulate the EH stack 3915. In this example, the constructor of object 1 is identified first at 3810, this is pushed as a node on to the evaluation stack at 3910. Later at 3820, the code for the destructor of object 1 is encountered which is also temporarily pushed on to the evaluation stack. When the reader encounters the Oppushstate operator at 3830 then it is known that the destructor 3820 and constructors 3810 were operands of the Opushstate operator 3830. It is also known that the destructor code is a handler so needs to be placed within the DTOR code data structure 3925. Thus, the top node on evaluation stack 3905 related to destructor of object 1 is popped and eventually appended to the DTOR code data structure 3925 along with a label identifying the block. The DTOR code data structure 3925 is also appended with the FINALLY and ENFINALLY instructions with the appropriate continuations as shown in FIG. 39. The EH stack 3915 would have been initialized to have a node 3920 with a label preceding the UNWIND instruction, but now a new node 3940 is added to the EH stack and its label is set to the label added to the block of code containing FINALLY and ENDFINALLY instructions. Up to this point the intermediate code related to the exception paths and continuations have been determined. The code for object 2 is evaluated in a similar manner. Later at 3840 when the Opdtoraction operator is encountered the intermediate code related to explicit entry (i.e., FINAL instruction) into the finally region is built as shown at 2410 and 2420. FIG. 39 shows the state of the evaluation stack 3905, the DTOR code data structure 3925, and the EH stack 3915 after the intermediate language code of FIG. 38 up to the point where the OPpushstate instruction 3830 has been evaluated. Thus, all the code necessary for stitching together the code for intermediate representation is contained within the data structures 3905, and 3925 and their various nodes, which can be added to form the complete translated code. Although, the method for evaluating and stitching together code for the various operators may be different, the various data structures described above may be used within the context of each individual operator and its function and form to generate the desired intermediate representation.

Alternatives

Having described and illustrated the principles of our invention with reference to the illustrated embodiments, it will be recognized that the illustrated embodiments can be modified in arrangement and detail without departing from such principles. Although, the technology described herein have been illustrated via examples using compilers, any of the technologies can use other software development tools (e.g., debuggers, optimizers, simulators and software analysis tools). Also, it should be understood that the programs, processes, or methods described herein are not related or limited to any particular type of computer apparatus. Various types of general purpose or specialized computer apparatus may be used with or perform operations in accordance with the teachings described herein. Actions described herein can be achieved by computer-readable media comprising computer-executable instructions for performing such actions. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method implemented at least in part by a computing device of processing a source language independent intermediate representation of software comprising exception handling constructs, the method comprising:

reading the source language independent intermediate representation of software comprising exception handling constructs; wherein the source language independent intermediate representation explicitly expresses exception handling control flow of the software, wherein the source language independent intermediate representation comprises a single set of instructions for representing a plurality of exception handling models of a plurality of source languages, and wherein the exception handling control flow is determined using the single set of instructions by using an offset containment relationship to map offsets of protected code blocks to labels of their destination and handler blocks; and generating, in a computer-readable media having a tangible component, a computer-readable version of the software implementing the exception handling control flow based on the source language independent intermediate representation.

2. The method of claim 1, wherein the source language independent intermediate representation comprises:
  a first instruction, of the single set of instructions, for expressing transfer of control to a finalization code block;
  a second instruction, of the single set of instructions, for expressing acceptance of control transfer into the finalization code block; and
  a third instruction, of the single set of instructions, for expressing transfer of control out of the finalization code block.

3. The method of claim 2, wherein the finalization code block comprises code related to destructor of an object.

4. The method of claim 2, wherein the finalization block comprises code related to destructor of an expression temporary object.

5. The method of claim 2, wherein destination operands of the second instruction are the same as source operands of the third instruction.

6. The method of claim 2, wherein the first instruction for expressing explicit transfer of control to the finalization code block further comprises:
  a label indicative of a beginning of the finalization code block to he used for expressing transfer of control to the finalization block; and
  a label indicative of a continuation for control transfer after exiting the finalization code block.

7. The method of claim 2, wherein the second instruction for expressing acceptance of control transfer into the finalization code block is preceded by a label indicative of a beginning of the finalization code block and transfer of control to the finalization block is indicated by the use of the label.

8. The method of claim 2, wherein the third instruction for expressing transfer of control out of the finalization code block comprises fields for indicating different continuations for control transfer out of the finalization code block based on whether entry into the finalization code block was explicit or due to an exception.

9. A system for implementing source language independent exception handling intermediate representations for multiple source code languages, the system comprising:
  a general purpose or specialized computer apparatus implementing an intermediate language reader, for obtaining an intermediate language representation of a source code file and generating a source language independent intermediate representation of exception handling constructs of the source code based on the intermediate language representation;
  wherein the source language independent intermediate representation explicitly expresses exception handling control flow of the source code, wherein the source language independent intermediate representation comprises a single set of instructions for representing a plurality of exception handling models of the multiple source code languages, and wherein the exception handling control flow is determined using the single set of instructions by using an offset containment relationship to map offsets of protected code blocks to labels of their destination and handler blocks.

10. The system of claim 9 further comprising a compiler for generating object code based on the source language independent intermediate representation.

11. The system of claim 9, wherein the source language independent intermediate representation of the exception handling constructs further comprises a first instruction, of the single set of instructions, for catching an exception and returning an exception object related to the exception and a second instruction, of the single set of instructions, for specifying a handler for the exception based on a type value of the exception object.

12. The system of claim 11, wherein the second instruction for specifying the handler comprises:
  at least one Boolean source operand for indicating the type value of the exception object;
  at least one source operand indicating a label preceding a code block related to the handler to which control flow will pass if the Boolean source operand is true; and
  at least one source operand indicating a label preceding a code block related to a continuation to which control flow will pass if the Boolean source operand is false.

13. The system of claim 9, wherein the source language independent intermediate representation of the exception handling constructs further comprises at least one instruction, of the single set of instructions, for specifying a handler for an exception based on a type value of an exception object related to the exception, wherein a destination operand of the at least one instruction comprises a predetermined exception object, a first source operand of the at least one instruction comprises a label indicative of a code block related to the handler and a second source operand comprises a label indicative of a code block related to a continuation.

14. The system of claim 13, wherein the at least one instruction is operative for comparing the type value of the exception object to a type value of the predetermined exception object and if there is a match, passing control flow to the code block related to the handler label and if there is no match, then passing control flow to the code block related to the continuation label.

15. The system of claim 9, wherein the source language independent intermediate representation of the exception handling constructs further comprises a first instruction, of the single set of instructions, for indicating entry into a try-except region; and a second instruction, of the single set of instructions, for selecting one of a plurality of control flow paths for exception handling based on a type value related to an exception, wherein the plurality of control flow paths available for selection includes a path related to resumption of execution of an instruction causing the exception.

16. The system of claim 15, wherein a handler for the first instruction for indicating entry into the try-except region is the same as a handler for the exception causing instruction, and wherein the second instruction for selecting the control flow path for exception handling comprises:
  an operand indicative of the type value of the exception;
  a label operand indicative of a handler code block;
  a label operand indicative of a continuation code block; and
  a label operand indicative of the exception causing instruction.

17. A computer readable storage medium having a tangible component and having stored thereon a source language independent intermediate representation of exception handling constructs of source code, the source language independent intermediate representation of exception handling constructs comprising:

a single set of instructions for representing a plurality of exception handling models of a plurality of source languages;

a first instruction, of the single set of instructions, for catching an exception and returning an exception object related to the exception; and a second instruction, of the single set of instructions, for specifying a handler for the exception based on a type value of the exception object;

wherein the source language independent intermediate representation explicitly expresses exception handling control flow of the source code, and wherein the exception handling control flow is determined using the single set of instructions by using an offset containment relationship to map offsets of protected code blocks to labels of their destination and handler blocks.

18. The computer readable medium of claim 17, wherein the second instruction for specifying the handler comprises:

at least one Boolean source operand for indicating the type value of the exception object;

at least one source operand indicating a label preceding a code block related to the handler to which control flow will pass if the Boolean source operand is true; and at least one source operand indicating a label preceding a code block related to a continuation to which control flow will pass if the Boolean source operand is false.

19. The computer readable medium of claim 18, wherein the code block related to the continuation is related to a filter.

20. The computer readable medium of claim 18, wherein the code block related to the continuation comprises an unwind instruction.

* * * * *